US012639750B2

(12) United States Patent
Seberson et al.

(10) Patent No.: US 12,639,750 B2
(45) Date of Patent: May 26, 2026

(54) DETERMINING IMPLIED INTEREST RATES BASED ON CRYPTOASSET DERIVATIVE TRADE DATA

(71) Applicant: Lukka, Inc., Naples, FL (US)

(72) Inventors: Troy Andrew Seberson, West Orange, NJ (US); Marius Adrian Radu, New York, NY (US)

( * ) Notice: Subject to any disclaimer, the term of this patent is extended or adjusted under 35 U.S.C. 154(b) by 109 days.

(21) Appl. No.: 18/220,650

(22) Filed: Jul. 11, 2023

(65) Prior Publication Data

US 2024/0221069 A1    Jul. 4, 2024

Related U.S. Application Data

(60) Provisional application No. 63/436,263, filed on Dec. 30, 2022.

(51) Int. Cl.
*G06Q 40/02* (2023.01)
*G06Q 40/04* (2012.01)

(52) U.S. Cl.
CPC ............. *G06Q 40/02* (2013.01); *G06Q 40/04* (2013.01)

(58) Field of Classification Search
CPC .............................. G06Q 40/04; G06Q 40/02
See application file for complete search history.

(56) References Cited

U.S. PATENT DOCUMENTS 10,044,646 B1 * 8/2018 Detwiler .................. H04L 69/22
2007/0239589 A1 10/2007 Wilson 2008/0189487 A1 * 8/2008 Craske ................ G06F 12/0859
                                                                711/E12.051
2013/0018818 A1 1/2013 Yadav
2015/0088783 A1 * 3/2015 Mun ...................... G06Q 40/02
                                                                705/36 R
2018/0060959 A1 * 3/2018 Gershon ................ G06Q 40/04
(Continued)

FOREIGN PATENT DOCUMENTS

JP            S62233825 A   * 10/1987

OTHER PUBLICATIONS

Lida, Zou, Hassan A. Alterazi, and Mohammed Helmi Qeshta. "Multi-level cache management of quantitative trading platform." Applied Mathematics and Nonlinear Sciences 6.2 (2021): 249-260.*

(Continued)

*Primary Examiner* — Asha Puttaiah
(74) *Attorney, Agent, or Firm* — Perkins Coie LLP

(57) ABSTRACT

An example method of determining implied interest rates based on cryptoasset derivative trade data includes: receiving, by a processing device, input data comprising at least one of: transaction data characterizing a trade in a derivative of a specified cryptoasset or a quote for the derivative of the specified cryptoasset; determining, based on the input data, a set of trade-level raw interest rates; generating, using the set of trade level interest rates, a set of interest rate vectors; aggregating the set of interest rate vectors to obtain a set of aggregated interest rate vectors; generating a non-fitted term structure associated with the set of aggregated interest rate vectors; generating a fitted yield curve model based on the non-fitted term structure; applying a signal-to-noise extraction filter to the fitted yield curve model; and generating, based on the filtered fitted yield curve model, an aggregated term structure model representing computed implied interest rates.

20 Claims, 14 Drawing Sheets

(56)                     References Cited

U.S. PATENT DOCUMENTS

| 2020/0258148 | A1 | | 8/2020 | Hummer | |
| 2020/0327609 | A1 | * | 10/2020 | Dubrofsky | ............. G06Q 40/06 |
| 2021/0056635 | A1 | | 2/2021 | Rogerson | |
| 2021/0208846 | A1 | | 7/2021 | Vick | |

OTHER PUBLICATIONS

Huang, Z, (Jun. 2021) Fitting Yield Curve with Dynamic Nelson-Siegel Models: Evidence from Sweden, Uppsala University (https://www.diva-portal.org/smash/get/diva2:1593645/FULLTEXT01.pdf) (Year: 2021).*

Bock, M. "WTF is an API? How the Internet Works Behind the Scenes" Jan. 20, 2015. (https://hackernoon.com/apis-how-the-internet-works-behind-the-scenes-690288634c32) (Year: 2015).*

Lida, Zou, Hassan A. Alterazi, and Mohammed Helmi Qeshta. "Multi-level cache management of quantitative trading platform." Applied Mathematics and Nonlinear Sciences 6.2 (2021): 249-260. (Year: 2021).*

JP S62233825 A ( Machine Translation Dec. 22, 2025) (Year: 2025).*

International Search Report and the Written Opinion of the International Searching Authority for PCT Application No. PCT/US2023/027532, dated Jul. 12, 2023, 10 pages.

Soska et al., "Towards Understanding Cryptocurrency Derivatives: A Case Study of BitMEX," ACM Digital Library (publication date: Jun. 3, 2021), 14 pages.

\* cited by examiner

230

| 310 Exchange ID | 320 Derivative type | 330 Underlying asset/index ID | 340 Derivative price | 350 Maturity | 360 Timestamp |
|---|---|---|---|---|---|

410 Receive derivative trade data

420 Identify most recent known underlying spot trade

430 Determine simultaneity error

440 Determine time to maturity

450 Apply consistency checks

460 Determine implied interest rate

500

510 Identify derivative trade data

520 Determine time to maturity

530 Generate time-series array R

540 Group time series by time and maturity

550 Generate set of R vectors for all maturities

560 Compute thresholds

570 Apply filters

600

| $r$ | $t_F$ | $\tau$ | $m$ |
|---|---|---|---|
| 6.396956 | 2022-03-29 00:00:07.314691+00:00 | 7.564691 | 185 |
| 6.465949 | 2022-03-29 00:00:18.994544+00:00 | 5.454544 | 185 |
| 6.092701 | 2022-03-29 00:00:24.296738+00:00 | 10.756738 | 185 |
| 6.795977 | 2022-03-29 00:00:42.942575+00:00 | 12.602575 | 185 |
| 6.795977 | 2022-03-29 00:00:43.304274+00:00 | 12.964274 | 185 |
| 6.795977 | 2022-03-29 00:00:43.765428+00:00 | 13.425428 | 185 |

710 Generate elements of RSj

720 Generate term structure set

730 Determine length of j-th term structure vector

740 Validate computed data

800

Validation
failed

810 Validate inputs

815 Perform consistency checks

820 Generate array of rates

825 Express computed rates as percentages

830 Generate array of maturities

835 Fit NS model

840 Determine NS parameters

850 Generate array of rates

1000

1010 Validate inputs

1015 Determine aggregate derivative price

1020 Generate arrays of derivative prices

1025 Determine weighting coefficients

1030 Determine weighted averages of derivative prices

1035 Determine aggregate reference spot price

1040 Generate array of interest rates

1045 Generate array of maturities

1050 Fit NS model

1060 Filter model parameters

1100

1110 Compute times to maturity

1120 Determine parameters of NS model

1130 Generate fixed maturity tenors

1200

1210 Receive input data (transaction data and/or quote data)

1220 Determine set of trade-level interest rates

1230 Generate set of interest rate vectors

1240 Aggregate set of interest rate vectors

1250 Generate non-fitted term structure

1260 Generate fitted yield curve model

1270 Apply filter

1280 Generate parameterized term structure model representing implied interest rates

DETERMINING IMPLIED INTEREST RATES BASED ON CRYPTOASSET DERIVATIVE TRADE DATA

REFERENCE TO RELATED APPLICATIONS

This application claims the benefit of U.S. Provisional Patent Application No. 63/436,263, filed Dec. 30, 2022, the entirety of which is incorporated herein by reference.

TECHNICAL FIELD

The present disclosure is generally related to computing systems, and more specifically relates to methods and systems for determining implied interest rates based on cryptoasset derivative trade data.

BACKGROUND

Cryptoassets are digital assets that use cryptographic techniques to generate a medium to be exchanged in public and/or private exchanges and to validate exchange transactions. Examples of cryptoassets include cryptocurrencies, utility coins, and security tokens.

BRIEF DESCRIPTION OF THE DRAWINGS

The present disclosure is illustrated by way of examples, and not by way of limitation, and may be more fully understood with references to the following detailed description when considered in connection with the figures, in which:

FIG. 3 schematically illustrates an example structure of a normalized transaction record utilized by systems and methods of the present disclosure;

FIG. 6 shows an example set of rates generated by the method 500 of generating a set of computed raw rates with a predefined frequency;

DETAILED DESCRIPTION

Figure 1:
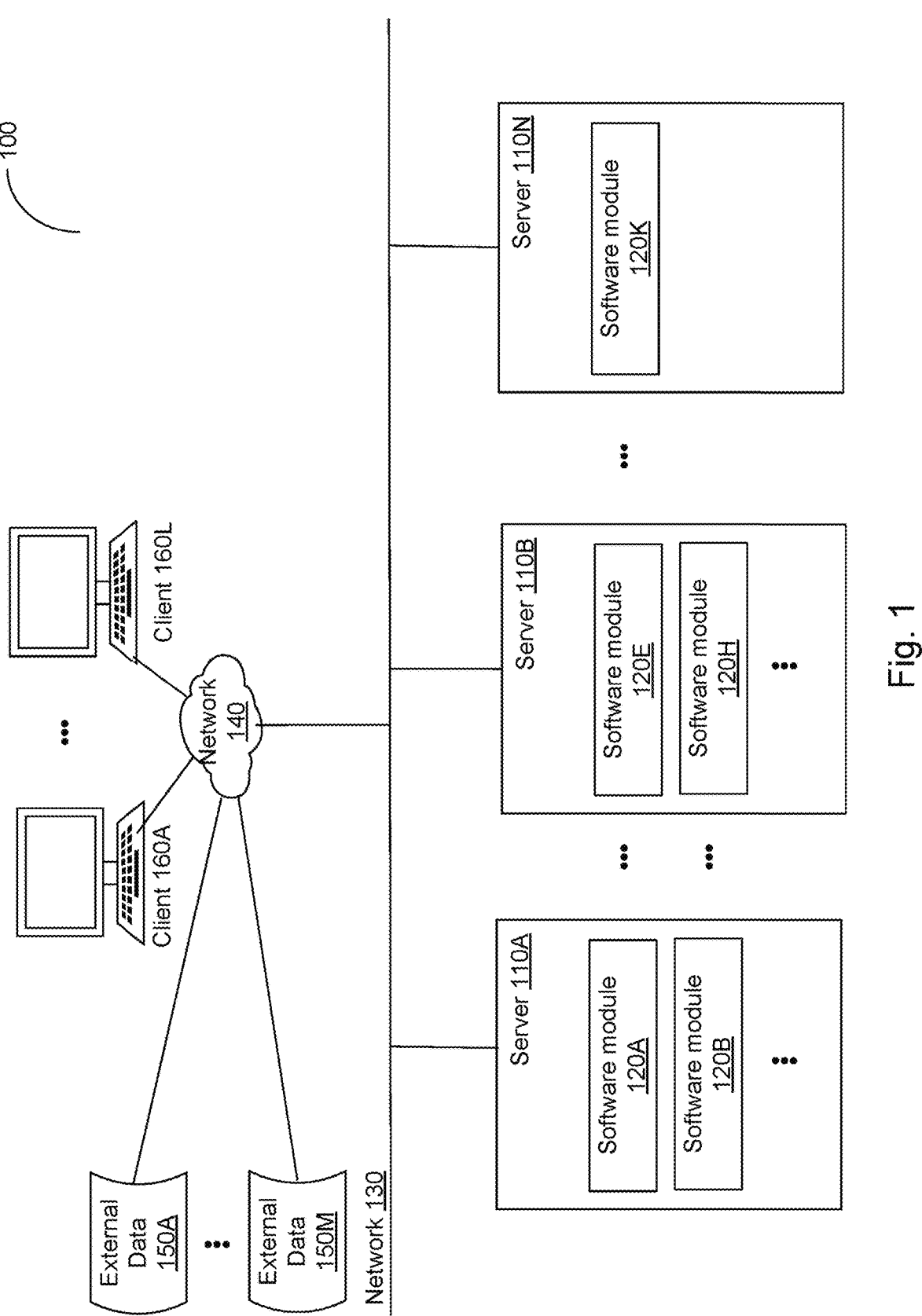
FIG. 1 schematically illustrates an example distributed computing system 100 operating in accordance with aspects of the present disclosure.

Described herein are systems and methods for determining implied interest rates based on cryptoasset derivative trade data.

An interest rate, which may be broadly defined as the amount of money that is due per period, as a proportion of the amount lent, deposited, or borrowed, is a fundamental quantitative characteristic utilized in financial markets. It is a required input in the valuation of real and financial assets, and in many financial models like the Capital Asset Pricing Model, Arbitrage Pricing Model, and various option pricing models.

The systems and methods of the present disclosure infer the interest rates from cryptoasset derivative trades. In some implementations, quote data reported by exchanges and/or other authoritative sources may be utilized by the systems and methods of the present disclosure in addition to (or instead of) trade data. Thus, unless specifically noted otherwise, any reference herein to trade data or transaction data should be interpreted as data that includes trade and/or quote data.

Various exchanges offer linear and/or inverse cryptoasset futures, which give their owner ability to leverage or hedge their cryptoasset positions. However, even if the trade data is aggregated over multiple exchanges, there may still be no single cryptoasset which would have available derivative products corresponding to every maturity within a chosen time period. Besides, the reported quote and trade times may be nonsynchronous with respect to each other.

Furthermore, not all observed asset trades may reflect the same underlying rate (e.g., due the observed trades being different in their respective liquidity premiums, risk premiums, instrument types, margin and fee structures, and exchange parameters).

Besides, inferring the interest rates from cryptoasset derivative trades may rely upon the market view of a given cryptoasset and its derivatives, which requires aggregation of information across exchanges, since trading of cryptoassets and related instruments may be significantly fragmented across multiple exchanges. Accordingly, reliability of information provided by an individual exchange may vary from high volume exchanges to low volume exchanges. Thus, the information needs to be aggregated across exchanges in order to create a representative view of the cryptoasset's derivatives market.

Aspects of the present disclosure address the above and other deficiencies by providing technology that aggregates cryptoassets derivative trading information across multiple exchanges. The systems and methods of the present disclosure compute interest rates of a chosen cryptoasset from derivatives (e.g., futures) at the exchange level, fit the term structure curve to a yield curve model (e.g., Nelson-Siegel-Svennsen (NSS) model where applicable), and apply a signal-to-noise filter to reduce the noise in the resulting interest rate. Additionally, the systems and methods of the present disclosure may aggregate the interest rates at the cryptoasset level, by combining implied interest rates across all exchanges to form a resulting dataset. This aggregate data may be determined by applying a weighting schema that utilizes weights that are proportional to the reliability and robustness of the data from each exchange.

Thus, the systems and methods of the present disclosure derive fair values for cryptoasset derivatives based on the data received from the cryptoasset ecosystem, which is significantly fragmented across exchanges. In computing the implied interest rates, the systems and methods described herein adequately address various challenges that are inherent to the cryptoasset ecosystem: nonsynchronous times of various reported values of the data that is needed for computation, significant variations of cryptoasset values over a chosen time period, interest rates that vary greatly across exchanges, depend on the time of a sale/transaction, sparse data being available, etc. Thus, the systems and methods described herein improve the accuracy, reliability, and efficiency of implied interest rate determination.

In various implementations, the computed implied interest rates and reference spot prices may be utilized in a wide range of applications related to cryptoassets, including derivative pricing, portfolio and risk management, trading, and quantitative research.

The systems and methods described herein may be implemented by hardware (e.g., general purpose and/or specialized processing devices, and/or other devices and associated circuitry), software (e.g., instructions executable by a processing device), or a combination thereof. In an illustrative example, a computing system implementing the systems and methods of the present disclosure may be provided by one or more virtual or physical execution environments (e.g., virtual or physical servers)

Various aspects of the above referenced methods and systems are described in detail herein below by way of examples, rather than by way of limitation.

FIG. 1 schematically illustrates an example distributed computing system 100 operating in accordance with aspects of the present disclosure. The computing system 100 may include one or more servers 110A-110N which implement respective virtual or physical execution environments running one or more software modules 120A-120K implementing the methods described herein. "Software module" herein refers to one or more files containing executable code and its dependencies, such as system and application libraries, application programming interface (API) definitions, media files, graphical user interface (GUI) definition files, etc.

In some implementations, the servers 110A-110N may be interconnected by one or more networks 130, which may include public and/or private networks. In some implementations, the servers 110A-110N may reside within a public or a private cloud. In some implementations, the servers 110A-110N may include one or more clusters of compute nodes, one or more storage nodes, and/or one or more presentation nodes.

In some implementations, the servers 110A-110N may be interconnected, via one or more external networks 140, to one or more external data feeds 150A-150M. In an illustrative example, the external data feeds 150A-150M may provide, in real-time and/or in batch mode, transaction data from multiple cryptoasset exchanges and/or reference data to be utilized in computing implied interest rates based on cryptoasset derivative trade data, as described in more detail herein below.

The servers 110A-110N may be accessible, via one or more networks 130 and/or 140, by client devices 160A-160L, which may be represented, e.g., by terminals, personal computers, mobile computing devices, etc. The client devices 160A-160L may be equipped with respective graphical user interfaces (GUIs). The input data received through the GUI(s) may be utilized for building a query to be forwarded to one or more servers 110A-110N. The response data returned by a server 110 in response to the query may be visually rendered by the requesting client device 160 in the form of text, tables, graphs, diagrams, etc.

Figure 14:
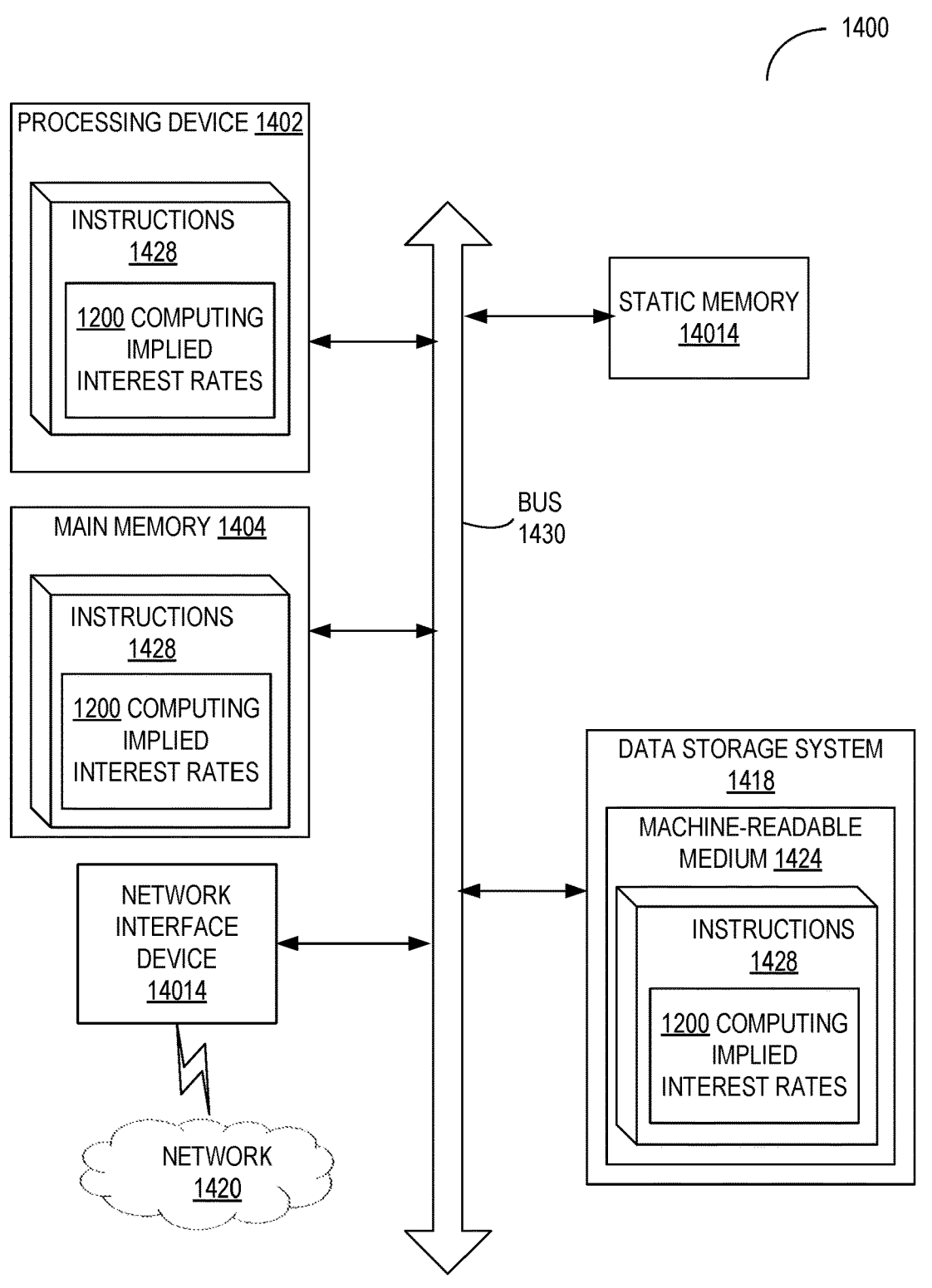
FIG. 14 depicts a block diagram of an example computing system operating in accordance with the examples of the present disclosure.

In some implementations, the servers 110A-110N may be implemented by one or more computing systems 1400 of FIG. 14.

Various auxiliary components, such as firewalls, routers, switches, consoles, etc., are omitted from FIG. 1 for clarity and conciseness.

Figure 2:
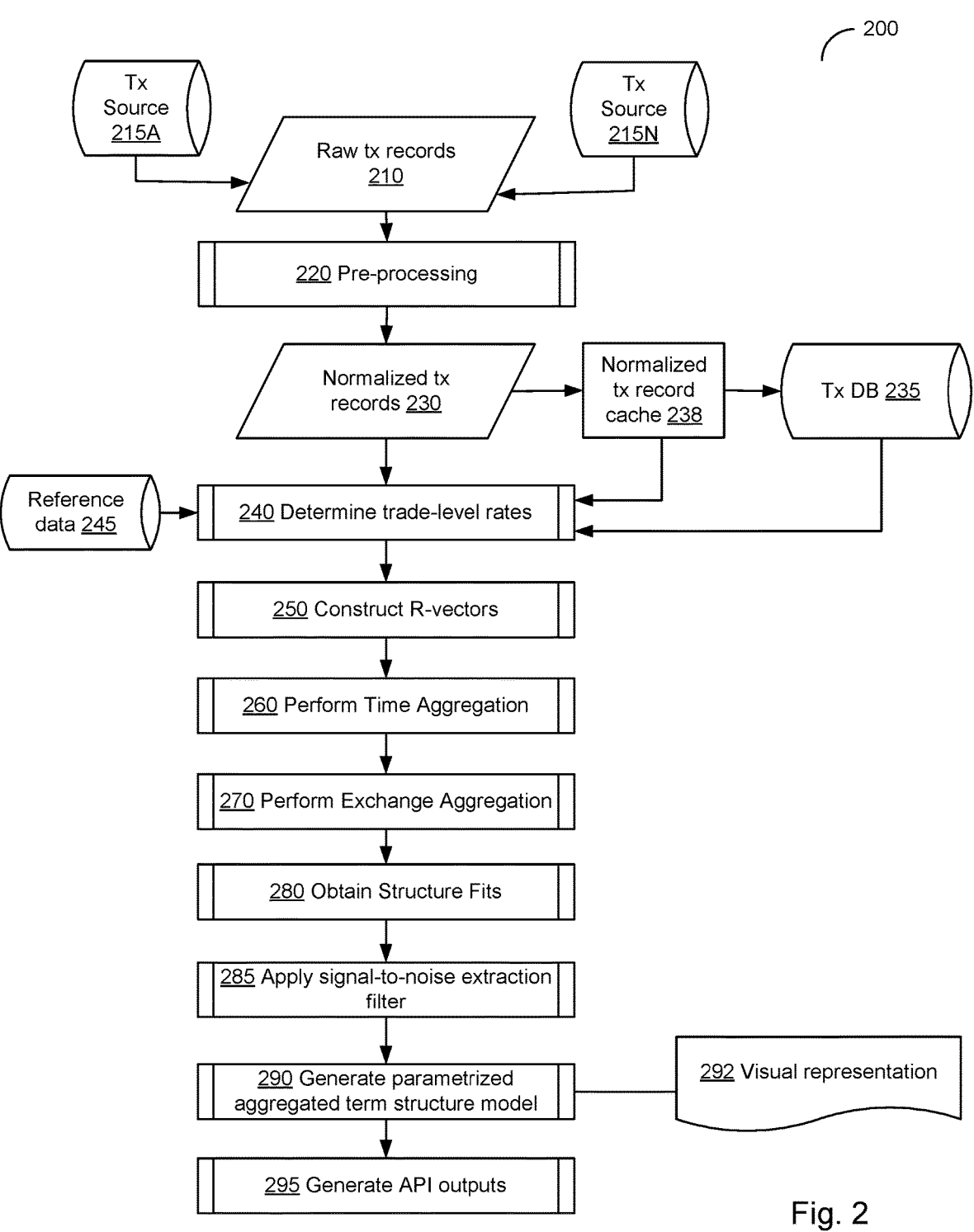
FIG. 2 schematically illustrates an example workflow of determining implied interest rates based on cryptoasset derivative trade data by a computing system operating in accordance with aspects of the present disclosure.

FIG. 2 schematically illustrates an example workflow 200 of computing implied interest rates based on cryptoasset derivative trade data by a computing system operating in accordance with aspects of the present disclosure. Workflow 200 and/or each of its individual functions, routines, subroutines, or operations may be implemented by one or more software modules running in one or more virtual or physical execution environments (e.g., virtual or physical servers) or collocated with other servers or applications. In an illustrative example, workflow 200 may be implemented by the example distributed computing system 100 of FIG. 1.

As schematically illustrated by FIG. 2, the computing system implementing the workflow 200 may continuously or periodically receive, from one or more trade data sources 215A-215N, batches of one or more transaction records 210 characterizing cryptoasset trades performed by one or more cryptoasset trading platforms (exchanges). In an illustrative example, each transaction record may reflect a trade in derivatives (e.g., futures) and thus may include information identifying the transaction date, the type of the derivative, the expiration date of the futures, the price of the futures, and the underlying cryptoasset or index.

In various implementations, a transaction record 210 may fully identify the parties to the transaction, pseudonymize the parties, or anonymize the parties. In an illustrative example, the parties to a transaction may be identified by their respective account identifiers. In another illustrative example, the transaction record may reference the parties to a transaction by their pseudonyms; a pseudonym associated with a party may be generated from a party identifying information by an irreversible transformation, such that each party identifier is transformed into a corresponding pseudonym, thus exclusively associating the pseudonym with the party identifying information. In another illustrative example, the parties to a transaction may be anonymized, i.e., the transaction record may contain no party identifying information.

While identification of the parties to the transaction is not required for determination of the implied interest rates by systems and methods operating in accordance with aspects of the present disclosure, the party identifying information or pseudonyms may in some implementations be utilized for identifying intra-group transactions performed between a group of related parties; such transactions may be excluded from consideration and/or given smaller weights as compared to arm-length transactions.

Figure 3:
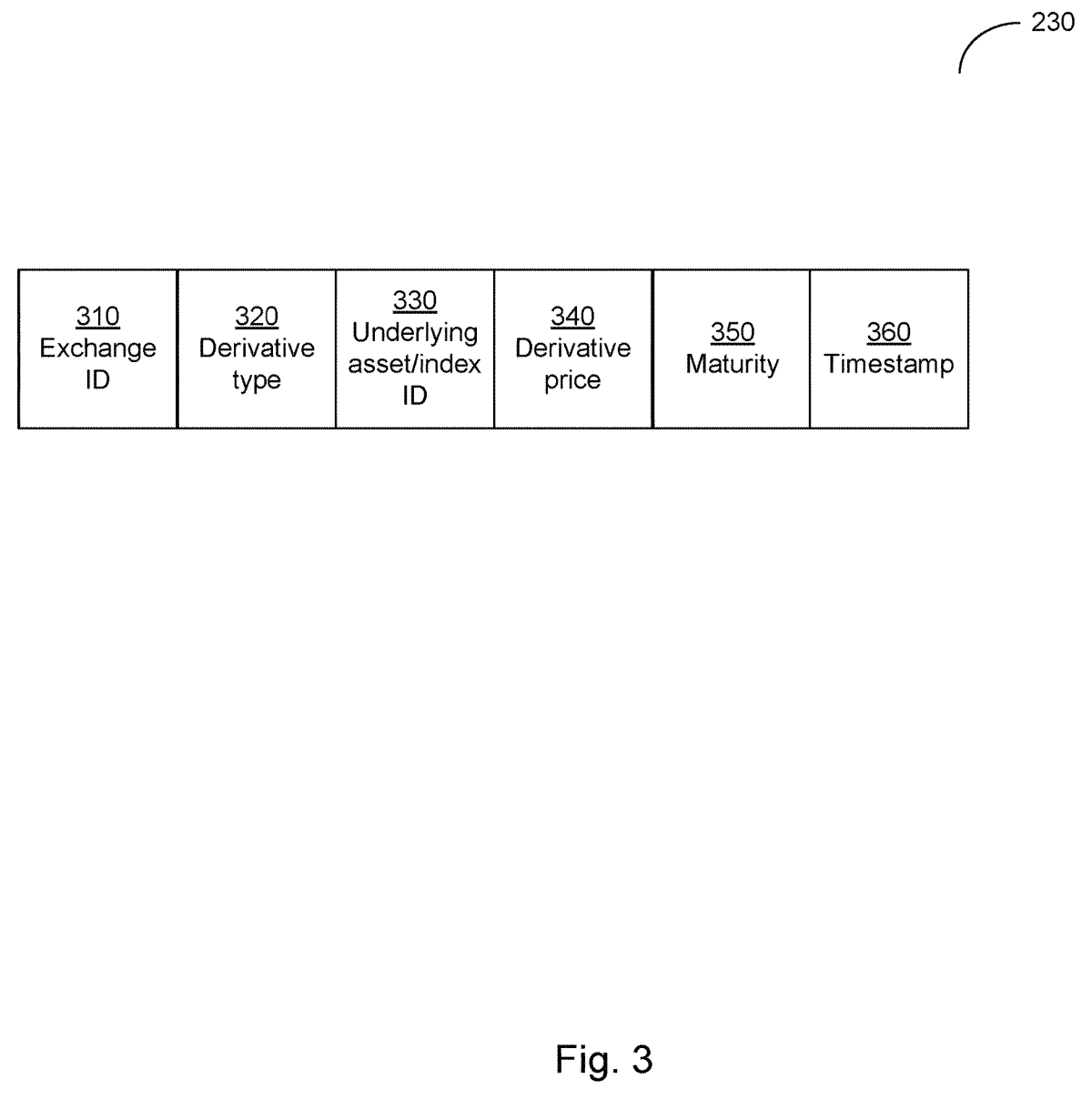

The computing system may perform a pre-processing operation 220, which translates the raw transaction records 210 into a set of normalized transaction records 230 conforming to a chosen format. Each normalized transaction record 230 may reflect a futures trade. As schematically illustrated by FIG. 3, each normalized transaction record 230 may include an identifier 310 of the exchange that has executed the transaction, the derivative type 320, an identifier 330 of the underlying cryptoasset or index, the price of the derivative 340, maturity 350 of the derivative, and the timestamp 360.

In some implementations, translating the raw transaction records 210 into normalized transaction records 230 may further involve validating and normalizing asset identifiers (e.g., by comparing an asset identifier specified by a transaction record to a reference list of asset identifiers). In an illustrative example, translating the raw transaction records 210 into normalized transaction records 230 may further involve validating and/or modifying various other transaction record fields (e.g., as described in more detail herein below). In another illustrative example, translating the raw transaction records 210 into normalized transaction records 230 may further involve appending, to the normalized transaction record, a weight coefficient characterizing the exchange that has provided the original raw transaction record and/or other transaction attributes specified by certain transaction record fields, as described in more detail herein below. In another illustrative example, translating the raw transaction records 210 into normalized transaction records 230 may further involve filtering the raw transaction records 210, by discarding the raw transaction records 210 that fail to satisfy one or more filtering conditions that may be defined based on one or more transaction attributes specified by certain transaction record fields, as described in more detail herein below.

The resulting normalized set(s) of transaction records 230 (e.g., indexed by the cryptoasset identifier, derivative type, trade date, maturity date, and/or other parameters) may be stored in volatile and/or non-volatile memory. In some implementations, a separate set of normalized transaction records may be stored in the transaction database 225 for each option type of a given cryptoasset or index.

In some implementations, one set of processing threads may receive and pre-process the raw transaction records 210, while another set of processing threads may perform the implied rate computation operations 240-295. "Processing thread" herein shall refer to a sequence of executable instructions that is executed by a physical or virtual processor in a separate execution context or in an execution context which is at least partially shared with other processing threads. The "execution context" herein shall refer to the processor state, the memory state, and the input/output (I/O) device state. The number of threads in each of the two sets of processing threads may be pre-defined or dynamically determined based on one or more operational parameters, such as the incoming transaction rate, the typical transaction processing time, the availability of hardware resources, etc. In an illustrative example, responsive to detecting a surge of the incoming transaction rate of receiving the raw transaction records 210 (e.g., an increase by at least a predefined threshold number of incoming transactions per unit of time that has been observed by at least a predefined period of time), the computing system may increase the number of processing threads that receive and pre-process the raw transaction records 210. In some implementations, the computing system may accordingly decrease the number of processing threads that perform the implied rate computation operations 240-295, in order to keep the total number of processing threads constant.

In some implementations, at least a subset of the normalized transaction records 230 filtered by cryptoasset identifier, derivative type, and/or other parameters may be stored in a data structure ("normalized transaction record data structure") that preserves a chronological order of their respective timestamps, such as a queue or a linked list, each element of which includes at least a subset of the fields of the example transaction record 230 of FIG. 3.

In some implementations, for decreasing the latency associated with the data retrieval and/or prioritizing the normalized transaction records for processing, the normalized transaction records may at least partially be cached in the normalized transaction record cache 238 residing in a random access memory (RAM) of the computing system executing the workflow 200.

In some implementations, the caching criterion employed for deciding whether a given normalized transaction record should be cached may be based upon one or more parameters, including transaction timestamp, underlying asset identifier, and/or exchange identifier. In an illustrative example, the most recent normalized transaction records may be cached, and the corresponding eviction policy may cause the transaction record having the least recent timestamp to be evicted should the cache become full. In another illustrative example, a predefined number of most extensively traded underlying cryptoassets may be chosen for caching their respective most recent normalized transaction records. In yet another illustrative example, one or more reference exchanges may be chosen for caching their reported transaction records. In yet another illustrative example, transaction records that are sampled across different times (e.g., randomly) may be cached, in order to ensure temporal diversity. In yet another illustrative example, transaction records that are sampled according to a distribution that has a higher probability of sampling trades between unrelated parties (arm-length trades) and a lower probability of sampling trades between related parties may be cached.

Various combinations of the above-described conditions may be constructed to form the caching criterion, e.g., caching the most recent normalized transaction records reported by the reference exchanges for a predefined set of most extensively traded cryptoassets.

In some implementations, the memory buffer storing the normalized transaction record cache may be split into multiple portions, such that each portion may be assigned to a respective cryptoasset of a predefined set of most extensively traded cryptoassets. In an illustrative example, the total size of the available RAM allocated to store the cache 238 may be split between the portions allocated to transaction records of the chosen cryptoassets proportionally to the trading volumes of the respective cryptoassets over a certain period of time at the reference exchanges. In some implementations, the allocation may be dynamically adjusted to reflect the changes in the trading volumes of the underlying cryptoassets at the reference exchanges. The cache memory allocation to the normalized transaction record data structures may be dynamically adjusted with a chosen frequency (e.g., once every 24 hours) or responsive to a certain triggering event (e.g., responsive to detecting a spike in the trading volume of a certain underlying cryptoasset).

In some implementations, the memory buffers caching the normalized transaction record data structures may be populated by one or more execution threads performing the pre-processing operations 220. In an illustrative example, responsive to translating a raw transaction record into a normalized transaction record, an execution thread performing the pre-processing operations 220 may ascertain whether the underlying cryptoasset associated with the normalized transaction record is one of the most extensively traded underlying cryptoassets that have been chosen for caching their respective normalized transaction records. If that is the case, the execution thread may cache the normalized transaction record in a memory buffer allocated for caching the normalized transaction record data structure for the underlying cryptoasset. In some implementations, the execution thread may store the normalized transaction record in the normalized transaction record database 235 synchronously with caching the normalized transaction record in the normalized transaction record cache 238, thus implementing a write-through caching policy. Alternatively, a write-back caching policy may be implemented, according to which storing a normalized transaction record to the normalized transaction record database 235 is delayed till the time when the normalized transaction record is evicted from the cache 238 pursuant to the applicable eviction policy (e.g., evicting the least recently created cache entry when the cache becomes full and a new record is available for caching and/or evicting the cache entries that have been processed by a processing threads performing the implied rate computation operations 240-295).

Alternatively, the memory buffers caching the normalized transaction record data structures may be populated by one or more background execution threads extracting the transaction data from the normalized transaction database 235. In some implementations, these background execution threads may run asynchronously with respect to execution threads implementing other operations of the workflow. In an illustrative example, a certain number of the available processing cores of the computing system implementing the workflow 200 may be assigned to a pool of worker execution threads, from which three subsets of execution threads may be allocated: (a) execution threads performing pre-processing operations 220 and storing the normalized transaction records in the database 235 (b) execution threads extracting the transaction data from the normalized transaction database 235 and populating the normalized transaction record cache 238, and (c) the execution threads extracting the transaction data from the normalized transaction record cache 238 and performing implied rate computation operations 240-295. In some implementations, in order to improve the efficiency of computations, the number of execution threads in each of the three subsets may be dynamically adjusted (i.e., decreased or increased), e.g., in response to the changes in the rate of incoming raw transaction records.

Referring again to FIG. 2, in some implementations, the incoming transaction records are processed, by operations 240-295 in real-time or near real-time as they are produced by the pre-processing operation 220. Alternatively, the normalized transaction records 230 may be retrieved by a processing thread performing the implied rate computation operations 240-295, asynchronously with respect to receiving and pre-processing the raw transaction records 210, from the normalized transaction record cache 238 before retrieving the non-cached transaction records from the transaction database 235.

In some implementations, normalized transaction records that have been processed by a processing thread performing the implied rate computation operations 240-295 may be evicted from the cache. Accordingly, the processing threads performing the implied rate computation operations 240-295 would process the cached normalized transaction records until the cache is exhausted, at which point the processing threads performing the implied rate computation operations 240-295 may switch to retrieving the normalized transaction records from the normalized transaction records database 235. Normalized transaction records stored in the database 235 that have been processed by a processing thread performing the implied rate computation operations 240-295 may be marked as processed. Processing the cached normalized transaction records before switching to non-cached normalized transaction effectively prioritizes the normalized transaction records, thus forcing the computed implied rates to be biased towards the normalized transaction records that have been selected for caching (e.g., transaction records reported by a predefined one or more reference exchanges with respect to a predefined set of underlying cryptoasset).

Furthermore, the above-described selective caching scheme results in more efficient (i.e., faster) access to the data required to perform the implied rate computation operations 240-295. Besides, splitting the RAM allocated to store the cache 238 between the portions allocated to transaction records of the chosen cryptoassets proportionally to the trading volumes of the respective cryptoassets over a certain period of time at the reference exchanges results in a more efficient use of the fixed amount of RAM allocated for implementation of the above-described caching scheme.

In some implementations, the computing system may selectively retrieve the normalized transaction records 230 from the cache 238 and/or from the transaction record database 235 based on logical conditions specifying values, ranges, or relationships of one or more transaction parameters, which allows caching certain intermediate results and/or reference data 245 in subsequent computations. In some implementations, the reference data 245 includes quotes for various cryptoassets provided by one or more quote sources. In some implementations, the reference data 245, including the quote data, may be pre-processed and/or cached in a manner similar to pre-processing and caching of the transaction data (e.g., raw transactions records 210).

Processing a normalized transaction record may involve determining the trade-level raw interest rates (operation 240). In an illustrative example, for each trade reflected by a corresponding normalized transaction record 230, the computing system may determine the implied interest rate. For example, the computing system may identify a spot price from the most recent trade that occurred within a certain time horizon, such as one hour or some other suitable time, and compute the implied interest rate as follows:

$$r(T, t_F) = \frac{1}{T - t_F}(\ln F_{T,t_F} - \ln S_{t_S})$$

where $r(T, t_F)$ is the implied interest rate of the Future/Underlying pair;

$F_{T,t_F}$ is the trade price of the futures contract maturing at time T which occurred at timestamp $t_F$;

$S_{t_S}$ is the reference (spot) price (e.g., obtained as part of reference data 245) of the underlying asset of the derivative instrument (futures) being considered, quoted at time $t_S$, also referred to as the spot price herein;

T is tenor, the date of maturity of the futures contract;

$t_F$ is the timestamp of the futures trade;

$t_S$ is the timestamp of the underlying trade; and $T-t_F$ is time till maturity of the futures contract.

Simultaneity error occurs when implied interest rates are computed using futures prices and spot prices that are traded at different times. This time difference is related to a variety of factors, such as differences in the liquidity of the futures and spot markets, differences in the demand for the contracts, or differences in the expectations of market participants about future economic conditions. If a large simultaneity error exists when computing implied rates, e.g., due to different underlying economic conditions, it can lead to errors in the estimates of the implied rates and affect the accuracy of financial analyses and decision-making based on those estimates. To minimize simultaneity error and help to ensure that the implied rates are as accurate and reliable as possible, a simultaneity threshold value, designated by Tc, may be imposed. The maximum simultaneity threshold may be computed based on estimated average transaction costs of a particular exchange.

Under the assumption of geometric Brownian motion for the underlying assets, the standard deviation of the implied rate is $$\sigma_r = \frac{1}{T - t_f} \sigma_S \sqrt{\tau_c},$$

where $\sigma_S$ is the historical volatility of the asset and $\tau_c$ is a simultaneity threshold. Setting a maximum allowed simultaneity error $\tau_c$ imposes a maximum allowed error on the model that is being used to calculate the implied rate. This relationship has been observed empirically. As the one-year rate is particularly important and exhibits slow dynamics, in one implementation, a maximum allowable tolerance of 15 basis points is imposed, or $\sigma_{r,max}=0.0015=\sigma_S\sqrt{\tau_c}$. This corresponds to an annualized error of 7.8% for a 7 day maturity. In some implementations, the simultaneity threshold may be determined as follows:

$$\tau_c = \left(\frac{f}{\sigma_S}\right)^2,$$

where f is an estimated cost. In an illustrative example, the (average) estimated costs for Bitmex, Deribit, OKEX and Binance are 0.00366, 0.0021, 0.00234, and 0.00264 (0.366%, 0.21%, 0.234%, an 0.264%), respectively.

In various implementations, the computing system may use an external input (e.g., reference data 245) or utilize a reference price of the most recent asset $S_{t_S}$. In some implementations, a maturity cutoff for short maturities (e.g., one week, two weeks) may be imposed, since prices of futures contracts with very short maturities may not be very accurate indicators of the underlying interest rates as the prices of futures contracts with longer maturities. The maturity cutoff for short maturities may be set at a certain number of days or weeks, as prices of futures contracts with longer maturities are expected to be more accurate and reliable. For example, in the Eurodollar futures market, the maturity cutoff may be set at 3 months. Maturity cutoffs for specific short maturities may be selected based on a number of factors, such as the volatility of the underlying crypto asset, the liquidity of the futures market, and the level of demand for crypto futures contracts with different maturities. In some implementations, maturity cutoffs are not fixed and may be changed with time depending on market conditions and the characteristics of the crypto futures contracts being traded.

In some implementations, data may be weighed by freshness (or, conversely, staleness). Freshness may be modeled with a decaying function, e.g., a decaying exponential with an empirically selected half-life, such as 6 hours, 4 hours, or any other suitable half-life time. Freshness characterizes the degree to which information becomes outdated or less representative over time. For example, freshness may be modeled as follows $$c_{S,j} = e^{-\alpha(T_h - t_j)}.$$

In this model, the Freshness of the information is represented by a value between 0 and 1, with 1 representing completely fresh information and 0 representing completely stale information. The rate at which the information becomes stale is determined by a half-life parameter. More specifically, α is the decay constant and is related to the half life, λ, by
   $\alpha=\ln 2/\lambda$.

$T_h$ is reporting time (the top of the hour).

$t_j$ is the last known trade of instrument j.

For example, if the half-life is λ=6 hours, the decay constant is:

$$\alpha = \ln 2/6 \text{ hours} = 0.1155 \ldots \text{ per hour}$$

Correspondingly, freshness of the data decreases by about 12% per hour.

In some implementations, the computing system may determine the trade-level implied interest rates by implementing the method 400 described herein below with references to FIG. 4.

Figure 5:
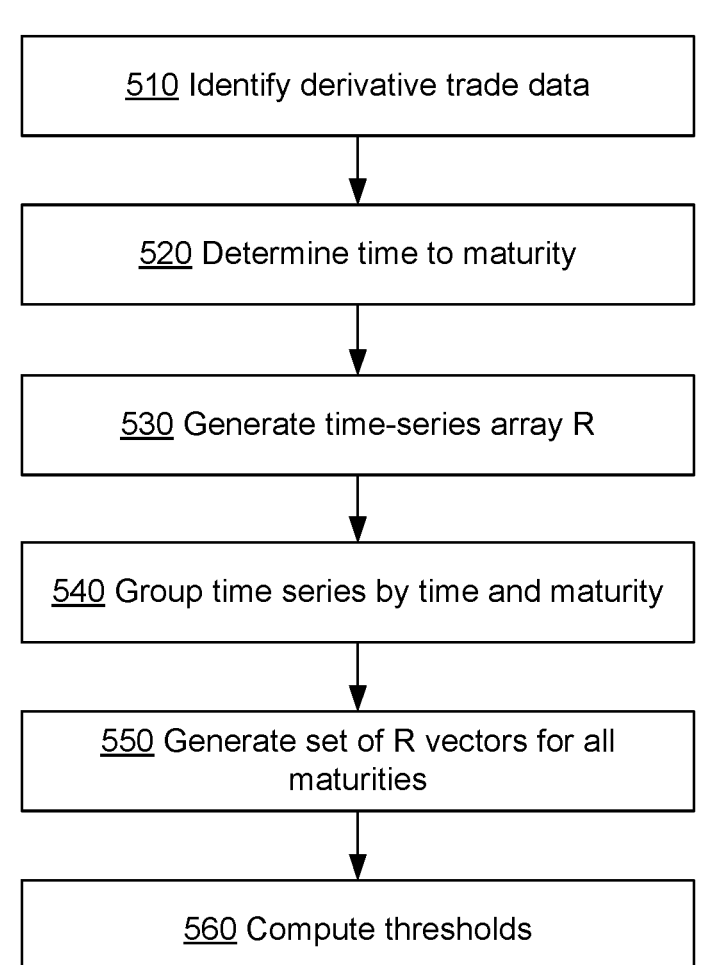
FIG. 5 is a flowchart of a method of generating a set of computed raw rates with a predefined frequency, in accordance with embodiments of the present disclosure.

Referring again to FIG. 2, at operation 250, the computing system constructs a set of trade-level interest rates, also referred to as R-vectors herein, which is a filtered and partitioned set of raw rates computed at operation 240 with a predefined frequency (e.g., 1 minute and 1 hour), as described in more detail with references to flowchart 500 of FIG. 5. The computing system may further validate the computed raw rates and discard the computed value that failed the validation filters. R-vectors represent the computed rates R(m, e, t) that depend on maturity time m (which is a time in the future) exchange index e, and trading time t (which is a time of the past) of futures trades. R-vectors may be considered vectors in the three-dimensional space with the where the dimensions are maturity time, exchange, and trading time.

Figure 7:
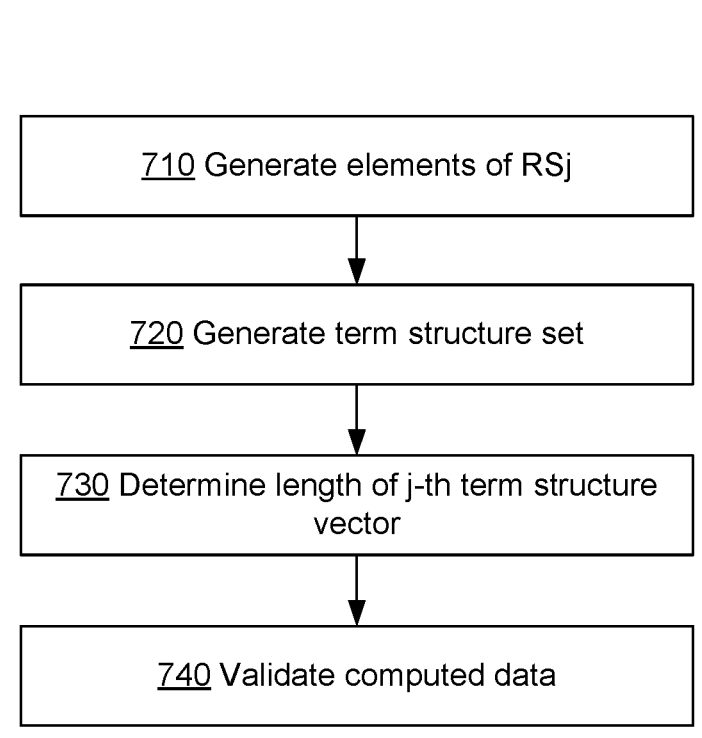
FIG. 7 is a flowchart of a method of generating a non-fitted term structure (TS) for every data partition, in accordance with embodiments of the present disclosure.

Referring again to FIG. 2, at operation 260, the computing system performs time aggregation for individual exchanges, as described in more detail with references to flowchart 700 of FIG. 7. For example, a volume-weighted average price (VWAP) aggregation method may be used. This may include weighing a particular traded security with a weight that reflects the ratio of the trading volume of this particular security to the total volume of all securities traded over a specific time period (e.g., one hour). An additional metric may include a time-weighted average price (TWAP) and may be calculated by dividing the total value of all traded securities by the total number of trades made at specific time periods. The VWAPs and TWAPs may be used to aggregate prices in order to obtain a more accurate and representative measure of the market price of a particular asset. Because these aggregation methods take into account both the volume and the times of the trades, they help to smooth out any potential distortions in the prices due to imbalances in the supply and demand for the asset. Using VWAPs in conjunction with TWAPs to aggregate rates can further help to ensure that the resulting rate is representative of the overall conditions and is not unduly influenced by a small number of outlier trades or by imbalances in the supply and demand for the asset. Additionally, using both VWAPs and TWAPs helps mitigate the impact of certain types of market manipulations or trading strategies aimed to distort the market price of an asset. In some implementations, a volume-weighted average rate (VWAR), rather than VWAP, may be used.

In some implementations, the following example procedure may be used for computing the TWAP of VWAP for an arbitrary time series $X_t$ may be used. A time period from $T_1$ to $T_2$ (e.g., an hour-long period) may be divided into N partitions (e.g., 6 partitions of 10 minutes each). For each partition, the VWAP may be computed using the following formula:

$$VWAP = \frac{\text{Sum (Volume of trade} \times \text{Value of } X)}{\text{Total volume of all trades in the partition}}.$$

The TWAP for the time period may be obtained by averaging the VWAPs for all N partitions using the following formula:

$$TWAP = \frac{VWAP_1 + VWAP_2 + \dots + VWAP_N}{N}.$$

Time aggregation may be performed at the partition level, e.g., $$r_{e,m}^k = r_{e,m,TWAP}^k = \frac{1}{N} \sum_{p=1}^{N} r_{e,m,p}^k$$

$$r_{e,m,p}^k = \sum_{t \in t_p} c_{e,m,t} r_{e,m,t}^k = \sum_{t \in t_p} v_{e,m,t} r_{e,m,t}^k \left( \sum_{t \in t_p} v_{e,m,t} \right)^{-1},$$

where $r_{e,m,TVWAP}^k$ is the TVWAP of the implied rates, $c_{e,m,t}$ are weights and $v_{e,m,t}$ are futures trade volumes.

Referring again to FIG. 2, at operation 270, the computing system aggregates the transaction data across multiple exchanges. Provided that derivatives have approximately (e.g., within 24 hours or some other suitable empirically set time) the same maturity, the derivatives may be aggregated across exchanges. In some implementations, aggregation across different exchanges may be performed while accounting for differences in trading volume, bid-ask spread, and time decay in order to obtain an accurate and representative measure of trading price. The following three parameters (coefficients) may control aggregation across exchanges.

Volume: differences in the volume of trades made on different exchanges can affect the overall market price of an asset, as a higher volume of trades may indicate a deeper book and greater demand for the asset which may result in a more stable rate.

Effective Bid-Ask Spread: The bid-ask spread is the difference between the highest price that a buyer is willing to pay for an asset (the "bid price") and the lowest price that a seller is willing to accept for the asset (the "ask price"). In general, a narrow bid-ask spread is often taken as an indicator of high market efficiency, as it suggests that there is a high liquidity and no significant imbalances exist in the supply and demand for the asset. The reverse is true of a wide gap. In some implementations, the possibility that different exchanges operate with widely different efficiencies.

Time decay, or freshness, i.e., the degree to which the information about an asset is out-of-date or no longer relevant.

Accounting for some or all of these three parameters ensures that the aggregated asset prices accurately reflect the overall market conditions.

In some implementations, the geometric mean of the three coefficients may be computed and normalized. The geometric mean may be more resistant (compared with, e.g., the arithmetic mean) to the effects of outliers in the data. In some implementations, the weight $\omega_{e,m}$ to be given to implied interest rates computed for exchange e and maturity m may be computed using, $$\omega_{e,m} = \left[ e^{-\alpha(T_h - t_{e,m}^{last})} \left( \frac{vol_{e,m}}{\sum_e^4 \sum_m^{NM_e} vol_{e,m}} \right) \left( \frac{sp_{e,m}^{-1}}{\frac{1}{NN} \sum_e^4 \sum_m^{NM_e} sp_{e,m}^{-1}} \right) \right]^{1/3}$$

where $T_h$ is the end of the aggregation time interval for time aggregation performed at block 260, $t_{e,m}^{last}$ is the time of the last known trade; $vol_{e,m}$ is the volume of futures with maturity m traded on exchange e during the aggregation time interval; $NM_e$ is the (dynamic) number of unique maturities on exchange e; NN is the number of unique futures; and $sp_{e,m}$ is the average bid-ask spread during a certain period (e.g., 24 hours) ending at $T_h$, which may be computed as, $$sp_{e,m} = \max \left( basp_c, \frac{1}{N_{24h}} \sum_{t \in (T_h - 24, T_h]}^{N_{24h}} (FAP_{e,m,t} - FBP_{e,m,t})/MP_{e,m,t} \right),$$

where $basp_c$ is a bid-ask truncation threshold; $MP_{e,m,t}$ is the time series of the mid price calculated by taking the average of the bid price $FBP_{e,m,t}$ and ask price $FAP_{e,m,t}$ at exchange e and maturity m.

$$MP_{e,m,t} = (FBP_{e,m,t} + FAP_{e,m,t})/2.$$

The volume of futures with maturity m traded on exchange e may be a sum of the time-series $v_{e,m,t}$ of the corresponding trades, $$vol_{e,m} = \sum_{t \in (T_h - 24, T_h]}^{N_{24h}} v_{e,m,t}.$$

The normalized weight $\hat{\omega}_{e,m}$ may be computed by rescaling $\omega_{e,m}$ with the weights aggregated over maturities and over different exchanges (e.g., 4 in this example), $$\hat{\omega}_{e,m} = \frac{\omega_{e,m}}{\sum_e^4 \sum_m^{NM_e} \omega_{e,m}},$$

yielding the final rate that is aggregated over different exchanges and is a function of maturity $$r_m^k = \frac{\sum_{e \in e_m} \hat{\omega}_{e,m} r_{e,m}^k}{\sum_{e \in e_m} \hat{\omega}_{e,m}}$$

The superscript k=1, 2, 3 enumerates rates calculated from futures trade prices (k=1), rates calculated from futures bid prices (k=2), and rates calculated from futures ask prices (k=3). This rate may be computed for every aggregation time interval e.g., every hour.

Referring again to FIG. 2, at operation 280, the computing system may obtain one or more structure fits. In particular, the computing system may perform a monotone convex structure fitting of the obtained aggregated rates $r_m^k$ as a function of maturity m to produce multiple sets of curves, e.g., a spot yield implied rate curve, an instantaneous forward rate curves, and a fixed interval forward rate curve. These curves may be produced on a rolling basis for consecutive aggregation time intervals.

Further at operation 280, the computing system may perform parametrization of the term structure in the form of a fitted yield curve model, e.g., Nelson-Siegel model (NS) or Nelson-Siegel-Svensson (NSS) model. In some implementations, a fitted yield curve model may include a shape parameter $\lambda$ and multiple $\beta_j$ parameters, e.g., as a level (e.g., $\beta_1$), a slope (e.g., $\beta_2$), and a curvature (e.g., $\beta_3$) parameters, if the NS model is being used. The NSS model uses two shape parameters $\lambda_1$ and $\lambda_2$ and an additional parameter (e.g., $\beta_4$), known as a "shift" parameter, which allows for a greater degree of flexibility in modeling the shape of the yield curve. This additional parameter allows the NSS model to more accurately represent the yield curve in cases where the curve exhibits nonlinear features, such as steepness, humpedness, or other deviations from a simple curve. The NSS model may also produce multiple (e.g., three) sets of curves, a spot yield implied rate curve, an instantaneous forward rate curve, and a fixed interval forward rate curve. These curves may also be produced on a rolling basis for consecutive aggregation time intervals.

In an illustrative example, the minimum number of data points in $TS_j$ to perform a term structure fit is four. While a fit is possible for L=3 or smaller, the resulting fit may be unstable. Fitting the model may be performed with ordinary least squares (OLS) given knowledge of the shape parameter $\lambda$, which removes the non-linearity in the model and may be determined by an R2 maximizing grid-search over the available historic data. In an illustrative example of the NS model, $\lambda$=31 days may be used. The shape parameter A may be updated regularly (e.g., every 3 months) and/or whenever the new future tenors are added to (removed from) the exchange.

An example implementation of a method of generating a fitted yield curve model is described in more detail herein below with references to FIG. 8. In some implementations, to extrapolate a yield curve using the NS model or the NSS model, a linear approximation may first be used, e.g., by fixing a shape parameter $\lambda_1$ (e.g., if the NS model is used) or multiple shape parameters $\lambda_1$ and $\lambda_2$ (e.g., if the NSS model is used). This makes the model a linear model of model parameters $\{\beta_i\}$. Next, the following operations may be performed.

Gather data on the yields for a set of benchmark yields with known maturities obtained after time aggregation and exchange aggregation.

Estimate the model parameters $\{\beta_i\}$ (e.g., level $\beta_1$, slope $\beta_2$, curvature $\beta_3$, for the NS model or level $\beta_1$, slope $\beta_2$, curvature $\beta_3$, and shift $\beta_4$ for the NSS model) that best fit the observed yields using a least squares regression algorithm.

Use the estimated model parameters to predict the yields for a set of out-of-sample maturities.

Use the estimated model parameters to predict the instantaneous forward rates for a set of out-of-sample maturities.

Use the estimated model parameters to predict fixed maturity forward rates for a set of out-of-sample maturities. Extrapolation of the rates outside of the region of the fit is performed using horizontal extrapolation, which returns the boundary value of the rate.

In some implementations, some of the fitting parameters $\{\beta_j\}$ may be determined using a trained machine learning model. For example, a trained machine learning model may be used to solve the nonlinear part of the fitting task and identify optimal values of shape parameters $\lambda_1$, $\lambda_2$ of the NSS model, etc. More specifically, the machine learning model may identify the shape parameters based on geometric features of a curve being fitted, e.g., peaks, troughs, inflection points, and the like. The machine learning model may be trained using previously collected transaction data and may be periodically retrained as more transaction data is collected.

Referring again to FIG. 2, at operation 285, the computing system may apply a signal-to-noise extraction filter (e.g., a non-coupled, diagonal Kalman filter) to the fitted model produced by operation 280, e.g., the NS model or NSS model. In some implementations, The Kalman filter is applied to the $\{\beta_j\}$ coefficients produced by operation 280. The output of the filter may have the same form $\{\beta_i\}^F$ where the superscript indicates that the coefficients have been smoothed. In some implementations, Kalman filter may be applied to some of the structure fits (e.g., structure fits obtained with the NS model or NSS model) and not applied to some other structure fits (e.g., structure fits obtained with the MonotoneConvex model).

Alternatively, if the model has not been fitted, a one-dimensional Kalman filter may be applied directly to the rates produced by operation 250, and thus $\tilde{r}_j = \{r_{m_1}^k,$ $r_{m_2}^k, \ldots, r_{m_L}^k\}$ will become $\tilde{r}_j^F$. In some implementations, instead of Kalman filter, the volume-weighted average rates (VWAR) and time-weighted average rate (TWAR) may be used.

An example implementation of a method of applying a signal-to-noise extraction filter to a fitted model is described in more detail herein below with references to FIG. 9.

Referring again to FIG. 2, at operation 290, the computing system generates a parametrized aggregated term structure model representing the resulting implied interest rates. Operation 290 may be implemented by performing the operations 250-280 with the increased time granularity (e.g., one hour). Furthermore, in repeating operation 280, the model fitting may be performed using all the data points available from every exchange, thus effectively creating an aggregate interest rate curve with coefficients $$\{\beta_j\}_{agg}.$$

In some implementations, the model fitting may be performed at the exchange level, e.g., after time aggregation but before exchange aggregation. Accordingly, in repeating operation 280, the Kalman filter may be applied to the aggregated model with coefficients $$\{\beta_j\}_{agg}.$$

All the consistency checks associated with operations 250-285 may also be applied, with necessary modifications, when performing operation 290. In some implementations, instead of applying Kalman filter to the coefficients {β}, the volume-weighted average rates (VWAR) and time-weighted average rate (TWAR) may be used. In some implementations, the computing system may generate visual representations 292 of the outputs of the generated parametrized aggregated term structure model representing the resulting implied interest rates.

An example implementation of a method of generating a parametrized aggregated term structure model representing the resulting implied interest rates is described in more detail herein below with references to FIG. 10.

Referring again to FIG. 2, at operation 295, the computing system generates the API output by using the fitted models to extrapolate spot interest rates, instantaneous forward rates, and forward rates from the minutely and hourly models. In some implementations, the following outputs may be generated:

Raw reference rates may be represented by the real time (trade time) vector $R_{t_F}$ produced by operation 240. This output is an implied rate computed every time a trade occurs without additional modeling.

Smoothed Rates may be produced for every exchange which generates implied rates, and not just ones which trade at three or more tenors. The smoothed rates may be generated by the one-dimensional Kalman filter.

Rate Statistics may be represented by every hour rate statistics of the data contained in R=[r, $t_F$, τ, m]. The statistics of each rate on a Rolling Daily Window (24 H) may include the standard deviation, aggregate (e.g., total, sum, median, or mean), maximum, skew, and/or kurtosis.

Fixed Maturities. Fixed maturity extrapolation may only be performed if a model fit has been applied to the data, either at the exchange level, or for the aggregate curve. The computing system may generate three separate curves:

Fixed tenor maturity yields;

$$m_{fixed} = (1, 2, 3, 7, 14, 21, 28, 60, 90, 120, 240, 360)$$

Instantaneous forward rates; and $$m_{inst} = (1, 2, 3, 7, 14, 21, 28, 60, 90, 120, 240, 360)$$

1 M Forward Rates $$m_{1mo} = (60, 90, 120, 240, 360).$$

For every time period (minutely, hourly) the computing system may extrapolate the rates following the procedure that is described in more detail herein below using the fitted Nelson-Siegel-Svensson model.

Figure 4:
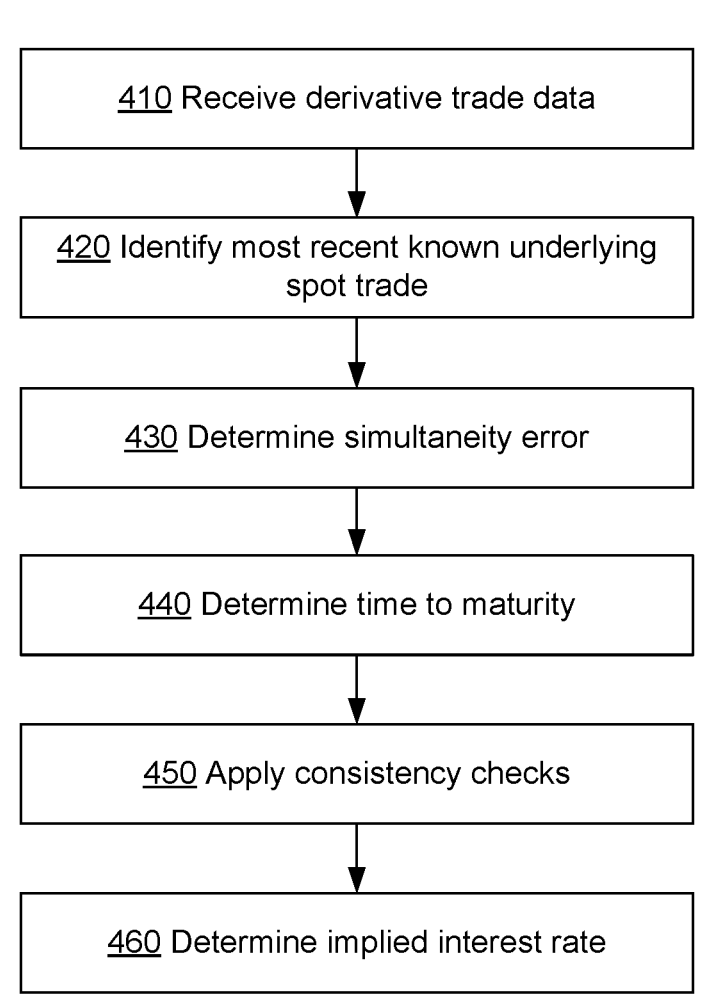
FIG. 4 is a flowchart of a method of determining implied interest rates based on a future and spot pair, in accordance with embodiments of the present disclosure.

FIG. 4 is a flowchart of a method 400 of determining implied interest rates based on a future and spot pair, in accordance with embodiments of the present disclosure. Method 400 and/or each of its individual functions, routines, subroutines, or operations may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some implementations, method 400 may be performed by one or more processors of the example computing system 100 of FIG. 1. In some implementations, method 400 may be performed by a single processing thread. Alternatively, method 400 may be performed by two or more processing threads, each thread executing one or more individual functions, routines, subroutines, or operations of the method. In an illustrative example, the processing threads implementing method 400 may be synchronized (e.g., using semaphores, critical sections, and/or other thread synchronization mechanisms). Alternatively, the processing threads implementing method 400 may be executed asynchronously with respect to each other. Although shown in a particular sequence or order, unless otherwise specified, the order of the operations may be modified. Additionally, one or more operations may be omitted in various implementations.

In some implementations, method 400 may be performed for every available derivative trade.

At operation 410, the computing system implementing the method identifies the trade (e.g., a future trade) to be processed. In some implementations, the future trade may be reflected by a normalized transaction record 230 of FIG. 2.

At operation 420, the computing system identifies the most recent known underlying spot trade that has occurred before the future trade identified at operation 410.

At operation 430, the computing system computes the simultaneity error by subtracting the timestamp of the last known spot trade from the timestamp of the future trade:

$$\tau = t_F - t_S$$

where τ is the simultaneity error;
$t_F$ is the timestamp of the future trade; and
$t_S$ is the timestamp of the most recent known underlying spot trade.

Responsive to ascertaining that the computed value of the simultaneity error is positive, the operations continue; otherwise, the method terminates with an error code reflecting the detected simultaneity violation.

At operation 440, the computing system determines the time to maturity by subtracting the delivery (expiration) date of the future from the current timestamp: T−$t_F$.

At operation 450, the computing system applies one of more of the following consistency checks to the inputs and reference data:

T, $t_F$ are datetime objects, and they are in the same time zone;

$$T - t_F > 0;$$

$T - t_F$ is in units of years;

$t_S < t_F$, i.e., the spot trade is before the future trade. This assumes that price discovery occurs in the future market and doesn't introduce forward-looking bias;

The spot trade is the latest occurring trade before the future trade such that $\tau = t_F - t_S$ is the minimum possible value;

$$\tau = t_F - t_S \text{ is positive;}$$

$$\tau = t_F - t_S \text{ is in units of seconds;}$$

$F_{T,t_F}$, $S_{t_S}$ are numeric datatype (integer, float) and not a non-a-number (NaN) value;

$$\text{Both } F_{T,t_F}, S_{t_S} > 0;$$

and $S_{t_S}$ is expressed in the same unit of currency as $F_{T,t_F}$ e.g. USD.

The trades failing the consistency checks may be excluded from the computations.

At operation 460, the computing system determines the implied interest rate $r(T, t_F)$ and stores the resulting value in a volatile and/or non-volatile memory. In some implementations, the computing system may utilize, for computing the implied interest rate, the equation that is described herein above with reference to operation 240 of FIG. 2.

FIG. 5 is a flowchart of a method 500 of generating a set of computed raw rates with a predefined frequency, in accordance with embodiments of the present disclosure. Method 500 and/or each of its individual functions, routines, subroutines, or operations may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some implementations, method 500 may be performed by one or more processors of the example computing system 100 of FIG. 1. In some implementations, method 500 may be performed by a single processing thread. Alternatively, method 500 may be performed by two or more processing threads, each thread executing one or more individual functions, routines, subroutines, or operations of the method. In an illustrative example, the processing threads implementing method 500 may be synchronized (e.g., using semaphores, critical sections, and/or other thread synchronization mechanisms). Alternatively, the processing threads implementing method 500 may be executed asynchronously with respect to each other. Although shown in a particular sequence or order, unless otherwise specified, the order of the operations may be modified. Additionally, one or more operations may be omitted in various implementations.

In some implementations, the method 500 may be performed for every available derivative trade.

At operation 510, the computing system implementing the method identifies the trade (e.g., a future trade) to be processed. In some implementations, the future trade may be reflected by a normalized transaction record 230 of FIG. 2.

At operation 520, the computing system determines the time to maturity by subtracting the delivery (expiration) date of the future from the current timestamp: $m = T - t_F$.

At operation 530, the computing system generates the following 4-component array of time series $R_t$:

$$R_t = [r, t_F, \tau, m]$$

where $r = r(T, t_F)$ is the implied interest rate of the future/ underlying paid computed at operation 240 of workflow 200.

The maturity column m will contain as many tenors as are traded on the chosen exchange, such that $m \in \{m_i\}$ with $i = 1, 2, 3, \ldots, k$ At operation 540, the computing system groups the time series in R by time period (e.g., one minute) and maturity. For example, is the chosen the real time is just after midnight, 00:00:00 UTC, the computing system may define $R_1^{m_i}$ as the time series spanning time from 00:00:00 to 00:01:00 UTC containing the components defined above [r, $t_F$, $\tau$, $m_i$] for a single maturity $m_i$. $R_2^{m_i}$ spans 00:01:00 to 00:02:00 UTC, and so on. The number of elements in $R_1^{m_i}$ corresponds to the number of trades that have occurred of the future asset with maturity of $m_i$ between 00:00:00 to 00:01:00 UTC. It may contain zero elements.

For any given maturity $m_i$ there are 1440 elements of $R_j^{m_i}$ in a given day, or $j = 1, 2, \ldots, 1440$. Some of these may be empty.

For any minute j the number of non-empty vectors $R_j^{m_i}$ depends on the number of futures traded in that minute. Thus, k is dynamic.

At operation 550, the computing system generates, with a chosen frequency (e.g., every minute) the set of 4-vectors R for all maturities. For the first minute this is $T_1 = \{R_1^{m_1}, R_1^{m_2}, \ldots, R_1^{m_k}\}$ where it follows that the length of $T_1$ is k. This implies that between 00:00:00 to 00:01:00 UTC, Futures were traded with k distinct tenors. Note that k itself is a function of time and that $\dim(T_j) = k_j$ or in other words, the length of $T_j$ for minute j is $k_j$. Furthermore, it is possible that k is zero.

At operation 560, the computing system computes the threshold variables that may be utilized by validation filters, such as $\tau_c$ representing the maximum simultaneity error (in seconds) between the future and the spot, and $m_c$ representing the minimum maturity cutoff (in days).

The maturity cutoff value $m_c$ is utilized to exclude the futures with less than $m_c$ days to maturity. In some implementations, the maturity cutoff value $m_c$ may be fixed (e.g., to 14 days). A particular maturity cutoff value may be determined as the value resulting in the largest error in the rate acceptable with respect to the leading order error source, the bid-ask spread. Taking into account that the standard deviation of the interest rate is inversely proportional to the time to maturity, the range of interest rates for a N day maturity will be double the range of a 2*N day maturity. Furthermore, a certain minimum number of traded tenors may be needed to fit a chosen implied interest rate model accurately (e.g., four traded tenors may be needed for fitting the NS model and six traded tenors may be needed for fitting the NSS model). Accordingly, the chosen maturity cutoff value should allow for availability of the requisite number of traded tenors.

At operation 570, the computing system applies the following filters to the inputs and computed data:

For every $R_j^{m_i}$, drop every element where $\tau > \tau_c$. If, as a result of applying this filter, any of the $\overline{R}_j^{m_i}$ will have zero elements, they are dropped from $T_j$; and Drop any element of $T_j$ if $m < m_c$.

FIG. 6 shows an example set of rates generated by method 500. In the example of FIG. 6, table 600 shows the set of rates with non-zero number of elements: $T_1=\{R_1^2, R_1^9, R_1^{16}, R_1^{64}, R_1^{185}, R_1^{332}\}$ and $R_1^{185}$ generated by a computing system implementing method 500 as described herein above. Although the maturities are given in minutes, in some implementations, other units of time may be used, e.g., hours, days, and so on.

FIG. 7 is a flowchart of a method 700 of generating a non-fitted term structure (TS) for every data partition (e.g., based on a moving time window of a predefined size), in accordance with embodiments of the present disclosure. Method 700 and/or each of its individual functions, routines, subroutines, or operations may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some implementations, method 700 may be performed by one or more processors of the example computing system 100 of FIG. 1. In some implementations, method 700 may be performed by a single processing thread. Alternatively, method 700 may be performed by two or more processing threads, each thread executing one or more individual functions, routines, subroutines, or operations of the method. In an illustrative example, the processing threads implementing method 700 may be synchronized (e.g., using semaphores, critical sections, and/or other thread synchronization mechanisms). Alternatively, the processing threads implementing method 700 may be executed asynchronously with respect to each other. Although shown in a particular sequence or order, unless otherwise specified, the order of the operations may be modified. Additionally, one or more operations may be omitted in various implementations.

At operation 710, the computing system implementing the method generates four elements of a statistical descriptor of aggregated rates $RS_j^{m_\pi}$ by applying the following functions to each element of $\bar{R}_j^{m_i}$:

Element 1: Time averaged VWAP of r. Type: float;

Element 2: $t_F$ corresponding to the last trade of r. Type: datetime;

Element 3: bid-ask spread and volume of trading. Type: float; and

Element 4: any value of m (they should all be the same). Type: integer.

Continuing the example above, $\bar{R}_1^{185}$ will become a multi-dimensional array, each element containing a single value as follows:
$RS_1^{185}$=(6.39696, Timestamp(2022-03-29 00:00: 07.314691), 7.92532, 80,000, 185).

At operation 720, the computing system generates a term structure set with an index representing the time of calculation (e.g. hour) $TS_j=\{RS_j^{m_1}, RS_j^{m_2}, \ldots, RS_j^{m_L}\}$.

Note that index L is used instead of k, since due to the filtering it is possible that L<k. Just like k, L is dynamic and may be time indexed for accuracy: $L_j$.

At operation 730, the computing system determines the value of $L_j$, which is the length of $TS_j$.

At operation 740, the computing system validates the computed data. The purpose of this validation operation is to ensure that any dimension changes of $TS_j$ are warranted. Fundamentally, in the case of staleness of a given tenor for a particular minute j, $RS_{j-1}^{m_i}$ should be propagated forward. Note that this can occur while $L_{j-1}=L_j$ holds.

The following three phenomena can contribute to the size change of $TS_j$:

(A) A new future with a new maturity has been traded for the first time. Consequently a new $RS_j^{m_k}$ has been created where mx is new maturity (never been traded before). If this occurs alone it leads to $L_{j-1}<L_j$.

(B) The lowest maturity tenor $m_1$ of minute j−1 corresponding to $RS_{j-1}^{m_1}$ has fallen below $m_c$. For redundancy, confirm that $m_1$ is indeed the lowest maturity of all elements in $TS_{j-1}$. If this occurs alone it leads to $L_{j-1}>L_j$ (C) No trades have occurred for the future with maturity $m_n$ with n=1, 2, . . . , k for minute j, or they have all been filtered out at operation 570 of method 500. Either way, this results in an empty bin. If this occurs alone it could lead to $L_{j-1}>L_j$.

Accordingly, the computing system may perform the following consistency checks:

For every minute j:

Check if either A or B have occurred.

Check if C has occurred, which can result in an empty bin and $L_{j-1}>L_j$ if it occurs on its own. This is not necessarily so because C may occur simultaneously with A and then $L_{j-1}=L_j$.

If A and/or B have occurred without C the check is passed. Do nothing.

If C occurs (either on its own or in conjunction with A and/or B). The check is failed and the last 4D rate array for the missing maturity (or maturities) $RS_{j-1}^{m_n}$ should be used instead. If desired, the exact staleness can be inferred from the 2nd element of $RS_{j-1}^{m_N}$.

Correct $TS_j$, and therefore $L_j$, by adding to it the number of forward propagated RS terms from IV.

Upon completion of the consistency checks, the method terminates.

Figure 8:
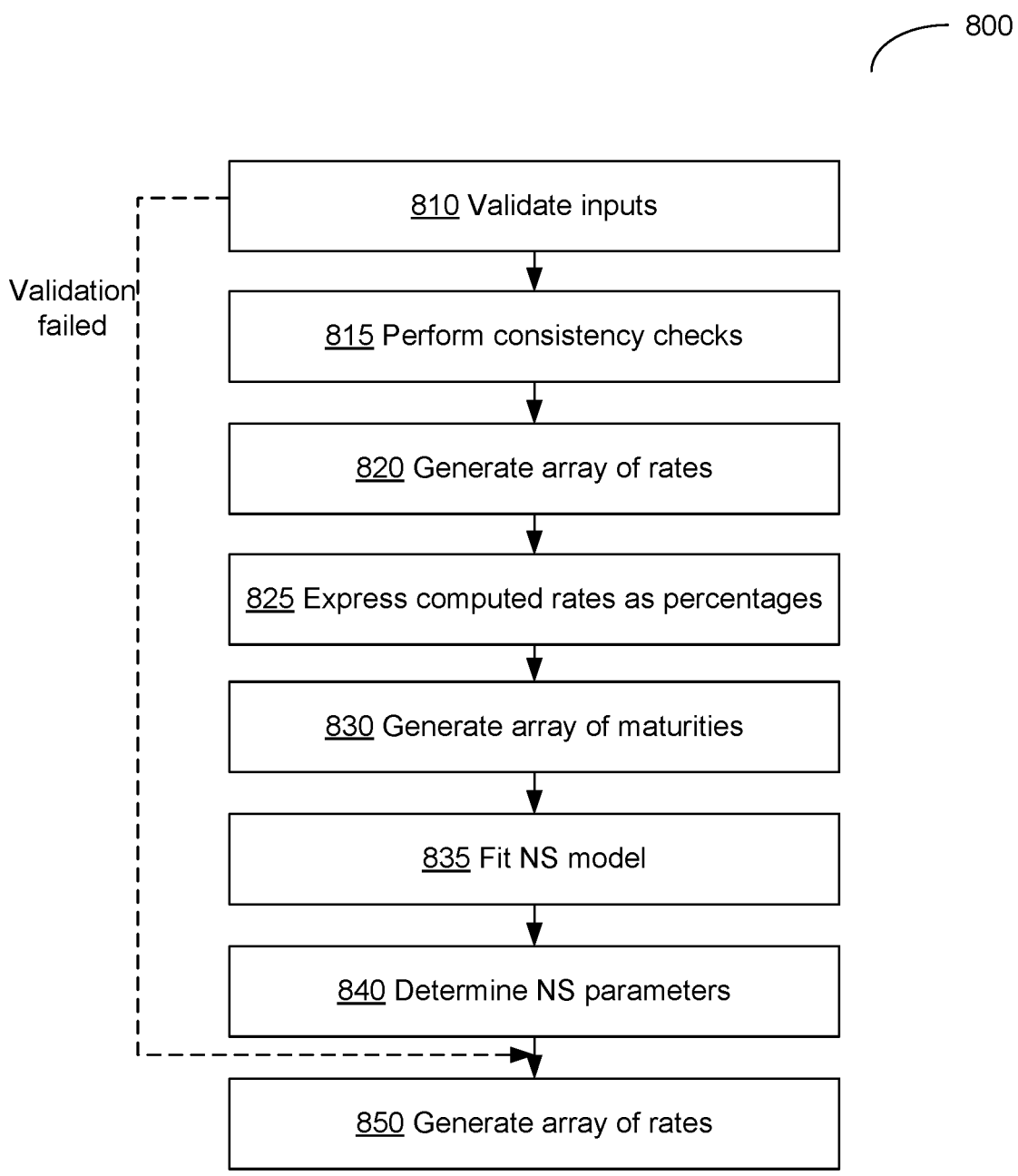
FIG. 8 is a flowchart of a method of generating a fitted yield curve model, in accordance with embodiments of the present disclosure.

FIG. 8 is a flowchart of a method 800 of generating a fitted yield curve model, in accordance with embodiments of the present disclosure. Method 800 and/or each of its individual functions, routines, subroutines, or operations may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some implementations, method 800 may be performed by one or more processors of the example computing system 100 of FIG. 1. In some implementations, method 800 may be performed by a single processing thread. Alternatively, method 800 may be performed by two or more processing threads, each thread executing one or more individual functions, routines, subroutines, or operations of the method. In an illustrative example, the processing threads implementing method 800 may be synchronized (e.g., using semaphores, critical sections, and/or other thread synchronization mechanisms). Alternatively, the processing threads implementing method 800 may be executed asynchronously with respect to each other. Although shown in a particular sequence or order, unless otherwise specified, the order of the operations may be modified. Additionally, one or more operations may be omitted in various implementations.

In some implementations, the method 800 may be performed with a chosen frequency (e.g., every j-th minute).

At operation 810, the computing system implementing the method validates the inputs by performing consistency checks. For example, in implementations using the NS model, the following consistency checks may be applied:

For every exchange and asset:

I. Check that minimum number of distinct future tenors≥4
  a. If minimum number of distinct future tenors≥4→Pass. NS model is employed b. If minimum number of distinct future tenors <4→Fail. NS model is not employed II. The exchange policy may be checked periodically to ensure no changes have occurred which would impact the application of the NS model.

III. A NS model fit will be applied on a per exchange per asset basis if the average number of tenors is 4 or more for the given instrument. Another example: An exchange may only offer futures with 2 tenors for both ETH and XBT. At no point are there 4 different tenors. A NS model fit will not be applied.

Responsive to determining that the exchange has failed the validation checks at operation 810, the method branches to operation 850; otherwise, the processing continues at operation 815.

At operation 815, the computing system performs the following consistency checks:

i. Check that $L_j \geq 4$;

ii. Check that dimension of $\widetilde{m_j} = \widetilde{r_j}$

If the average number of distinct future tenors>4 and the NS model is employed, it should be ensured that the minutely number of distinct tenors, $L_j$, doesn't fall below 4. Due to the future introduction policy the available number of future tenors on any given day will vary.

Responsive to determining that the exchange has failed the validation checks at operation 815, the method terminates with an error; otherwise, the processing continues at operation 820.

At operation 820, the computing system generates an array of rates by extracting the first element from each $RS_j$ in $TS_j$, $\widetilde{r_j} = \{r^{m_1}, r^{m_2}, \ldots, r^{m_L}\}$ where the size of $\widetilde{r_j}$ is L, also the size of $TS_j$ At operation 825, the computing system multiplies each rate in $\widetilde{r_j}$ by 100 to express them as percentages. This operation is performed for unit consistency in the NS fit.

At operation 830, the computing system generates an array of corresponding maturities by extracting the fourth element from each $RS_j$ in $TS_j$:

$$\widetilde{m_j} = \{m_1, m_2, \ldots, m_L\}$$

where in $\widetilde{m_j}$ the index j represents the minute, while inside the set $m_1$, $m_2$, . . . simply represent the different maturities at minute j. The size of $\widetilde{m_j}$ is also L. The units of $m_i$ are days.

At operation 835, the computing system fits the NS model using the $\widetilde{r_j}$ and $\widetilde{m_j}$ arrays and the shape parameter $\lambda$ specific to every asset and exchange.

At operation 840, the computing system determines the NS parameters $\beta_j = \{\beta_1, \beta_2, \beta_3\}_j$, and the method terminates.

The model fitting is not performed for exchanges that have failed the consistency checks of operation 810. Instead, at operation 850, the computing system generates an array of rates by extracting the first element from each $RS_j$ in $TS_j$ $\widetilde{r_j} = \{r^{m_1}, \ldots, r^{m_L}\}$ where the size of $\widetilde{r_j}$ is L, also the size of $TS_j$, and the method terminates (operation 860). Operations similar to the above may be performed in implementations in which the NSS model is used with four parameters $\beta_j = \{\beta_1, \beta_2, \beta_3, \beta_4\}$, determined using method 800.

Figure 9:
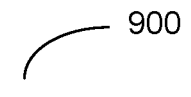
FIG. 9 is a flowchart of a method of applying a signal-to-noise extraction filter to a fitted model, in accordance with embodiments of the present disclosure.
Figure 9:
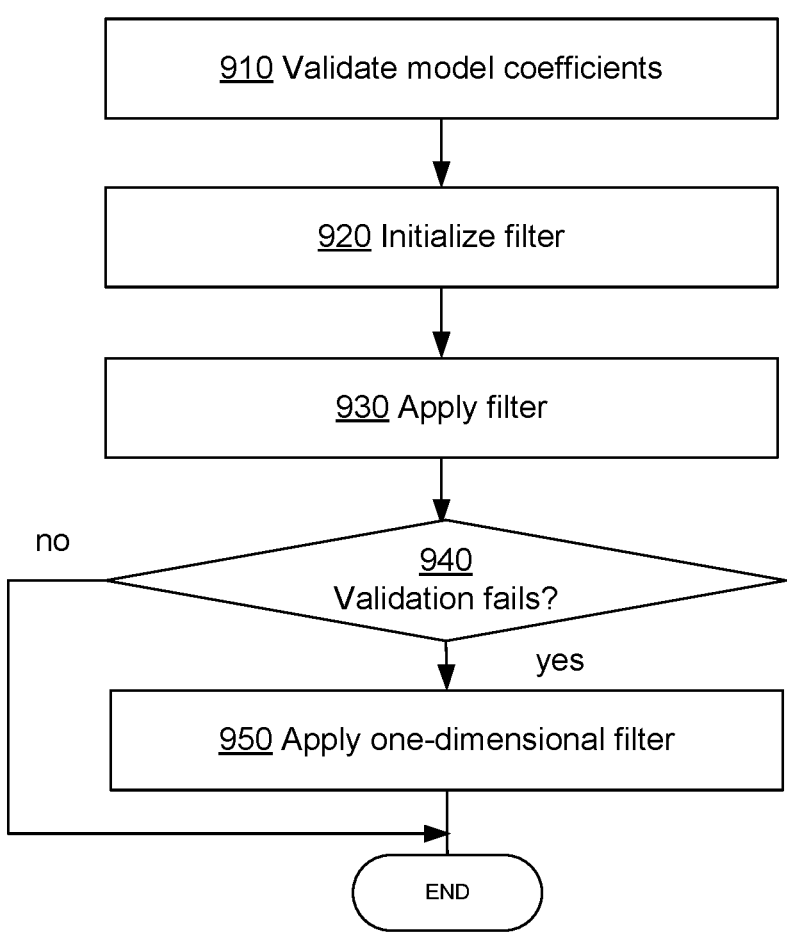

FIG. 9 is a flowchart of a method 900 of applying a signal-to-noise extraction filter to a fitted model, in accordance with embodiments of the present disclosure. Method 900 and/or each of its individual functions, routines, subroutines, or operations may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some implementations, method 900 may be performed by one or more processors of the example computing system 100 of FIG. 1. In some implementations, method 900 may be performed by a single processing thread. Alternatively, method 900 may be performed by two or more processing threads, each thread executing one or more individual functions, routines, subroutines, or operations of the method. In an illustrative example, the processing threads implementing method 900 may be synchronized (e.g., using semaphores, critical sections, and/or other thread synchronization mechanisms). Alternatively, the processing threads implementing method 900 may be executed asynchronously with respect to each other. Although shown in a particular sequence or order, unless otherwise specified, the order of the operations may be modified. Additionally, one or more operations may be omitted in various implementations.

At operation 910, the computing system implementing the method validates the parameters $\beta_j = \{\beta_1, \beta_2, \beta_3\}_j$ (for the NS model) or parameters $\beta_j = \{\beta_1, \beta_2, \beta_3, \beta_4\}_j$ (for the NSS model) produced by operation 280 of workflow 200. Responsive to determining, at operation 910, that at least one of coefficients is not defined (i.e., is either not a number or infinity), the method branches to operation 940; otherwise, the processing continues at operation 915.

At operation 920, the computing system initializes the filer. If it is the first time using the filter, it will require 1-2 hours of minutely data for the covariance matrices to converge with a tolerance of $10^{-4}$. The filter initialization function will output the filtered values, the covariance matrices and a factor which may be used to test convergence.

At operation 930, the computing system applies the filter, which may be performed with a chosen frequency (e.g., every j-th minute). The filter receives the three parameters $\beta_j = \{\beta_1, \beta_2, \beta_3\}_j$ (for the NS model) or four parameters $\{\beta_1, \beta_2, \beta_3, \beta_4\}_j$ (for the NSS model) and produces the filtered parameters $\{\beta_1, \beta_2, \beta_3, \beta_4\}_j^F$, and the method terminates (operation 950).

In an illustrative example, for the following input values:

$$\beta_{45} = \{6.43706625, -1.22911673, -2.27176072\}_{45}$$

the Kalman filter would produce the following output:

$$\beta_{45}^F = \{6.420, 0.323, -1.932\}_{45}^F,$$

as well as covariance matrices which may be used to construct confidence intervals for the rates.

Responsive to determining, at operation 940, that the coefficients $\beta_j = \{\beta_1, \beta_2, \beta_3, \beta_4\}_j$ produced by operation 280 of workflow 200 fail the validation operation 930, the computing system, at operation 950, a one-dimensional filter is applied. This filter may be used on every rate at any point of its maturity as the parameters are chosen to give statistically good noise reduction throughout the lifetime of the implied rate.

Example: For minute 45, for each of the rates in $$\widetilde{r_{45}} = \{5.4, 4.6, 5.2, 5.9, 6.1, 6.3\}$$

the filter would produce the following output $$\tilde{r}_{4.5} = \{5.52, 5.32, 5.57, 5.87, 6.12, 6.34\},$$

as well as covariance matrices which may be used to construct confidence intervals for the rates.

Since the Kalman filter is self-adjusting, a new initialization of the filter may be performed for each tenor. The individual filter will keep track of the variance in the market and weigh the measurement/estimate accordingly. In some implementations, instead of applying Kalman filter to the coefficients $\{\beta\}$, the volume-weighted average rates (VWAR) and time-weighted average rate (TWAR) may be used.

Figure 10:
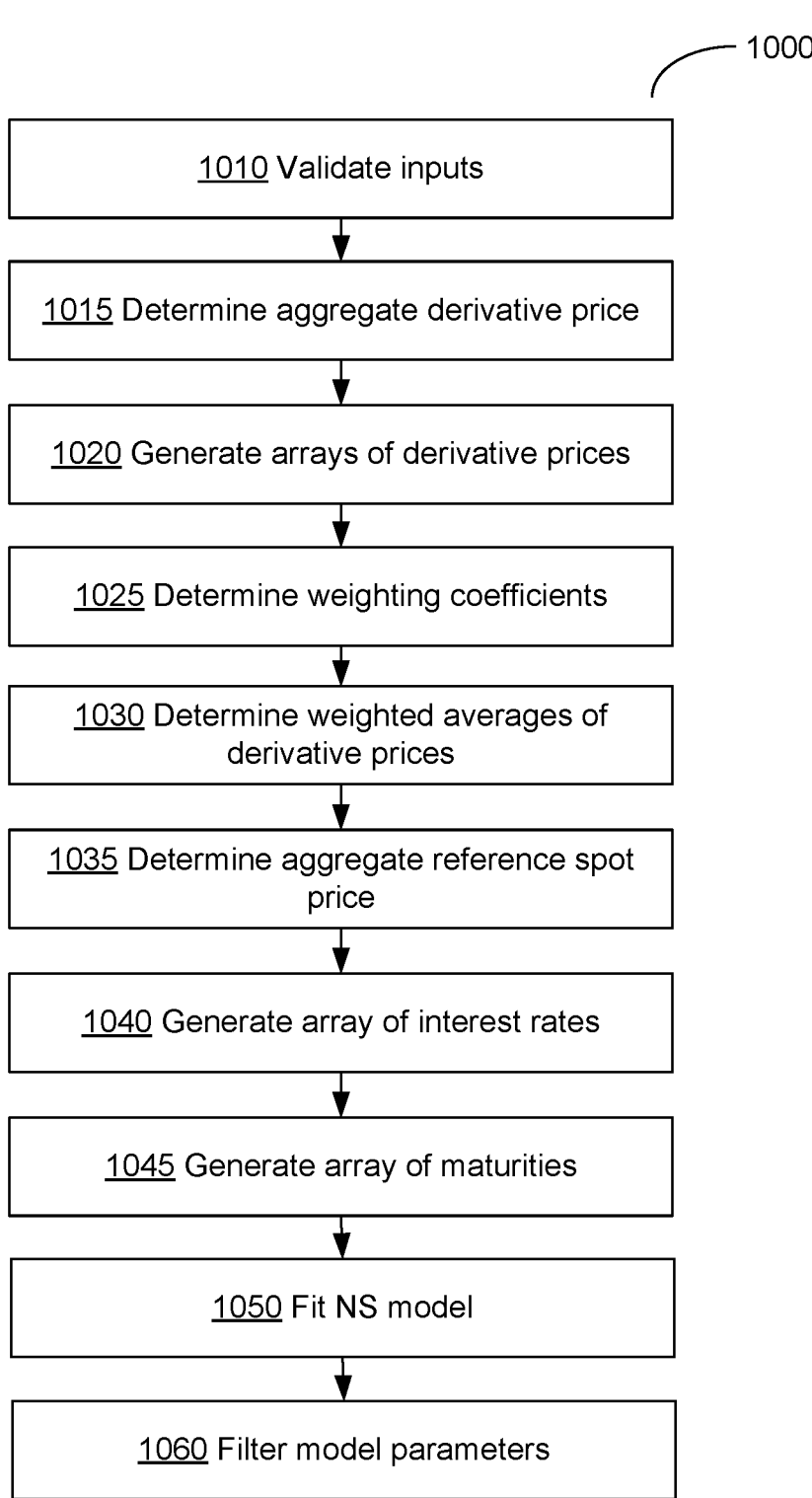
FIG. 10 is a flowchart of a method of generating a parametrized aggregated term structure model representing the resulting implied interest rates, in accordance with embodiments of the present disclosure.

FIG. 10 is a flowchart of a method 1000 of generating a parametrized aggregated term structure model representing the resulting implied interest rates, in accordance with embodiments of the present disclosure. Method 1000 and/or each of its individual functions, routines, subroutines, or operations may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some implementations, method 1000 may be performed by one or more processors of the example computing system 100 of FIG. 1. In some implementations, method 1000 may be performed by a single processing thread. Alternatively, method 1000 may be performed by two or more processing threads, each thread executing one or more individual functions, routines, subroutines, or operations of the method. In an illustrative example, the processing threads implementing method 1000 may be synchronized (e.g., using semaphores, critical sections, and/or other thread synchronization mechanisms). Alternatively, the processing threads implementing method 1000 may be executed asynchronously with respect to each other. Although shown in a particular sequence or order, unless otherwise specified, the order of the operations may be modified. Additionally, one or more operations may be omitted in various implementations.

In some implementations, method 1000 may be performed with a chosen frequency (e.g., every n-th hour).

At operation 1010, the computing system implementing the method implements the following filtering procedures: drop every element if $\tau > \tau T_c$, and drop any element if $m < m_c$.

At operation 1015, the computing system determines the aggregate (e.g., total, sum, median, or mean) futures price at the different exchanges and tenor levels.

At operation 1020, the computing system generates arrays of futures prices at each particular tenor where the futures are sourced from different exchanges and similar maturities. This operation may be performed for each tenor available thus producing a collection of arrays at each tenor.

At operation 1025, the computing system determines the weighting coefficients for each instrument in. In some implementations volume and time decay weights may be utilized, where basp_i and vol are the bid-ask spread and volume over the last 24-hour period for the given instrument.

At operation 1030, the computing system determines, for each tenor, the corresponding weighted average of the futures prices using the time decay weights. Thus, a single futures price at each tenor is determined.

At operation 1035, the computing system may determine the aggregate (e.g., total, sum, median, or mean) reference spot price.

At operation 1040, the computing system generates an array of interest rates, for each element in the tenors using the reference spot price produced by operation 1035.

At operation 1045, the computing system generates an array of the corresponding maturities to the above rates.

At operation 1050, the computing system fits the model (e.g., NS model) using the tenor arrays and the shape parameter, thus determining the model parameters $\{\beta_1, \beta_2, \beta_3\}_n$.

At operation 1060, the computing system feeds the three $\{\beta_1, \beta_2, \beta_3\}_n$ values to a 3D Kalman filter thus obtaining the filtered parameters $\{\beta_1, \beta_2, \beta_3\}_n^F$, and the method terminates. The filtered parameters may be utilized to extrapolate and generate the API output of workflow 200. In some implementations, instead of applying Kalman filter to the coefficients $\{\beta\}$, the volume-weighted average rates (VWAR) and time-weighted average rate (TWAR) may be used.

Figure 11:
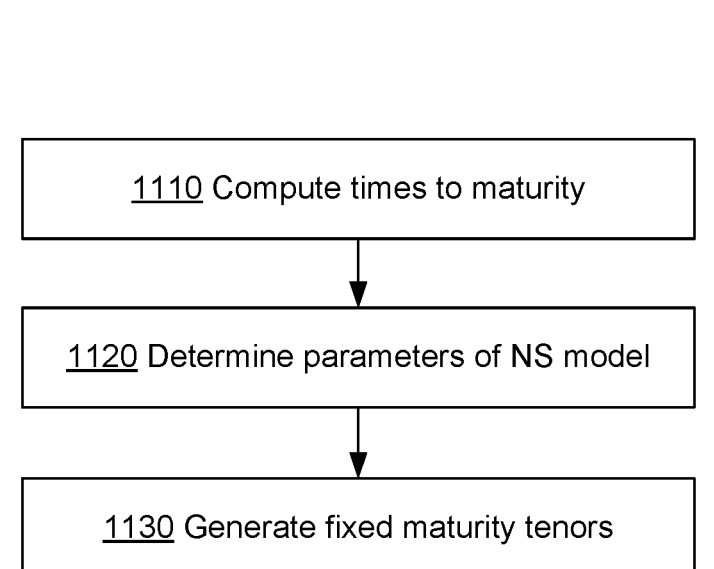
FIG. 11 is a flowchart of a method of fitting an example yield curve model (Nelson Siegel model), in accordance with embodiments of the present disclosure.

FIG. 11 is a flowchart of a method 1100 of fitting an example yield curve model (Nelson Siegel model), in accordance with embodiments of the present disclosure. Method 1100 and/or each of its individual functions, routines, subroutines, or operations may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some implementations, method 1100 may be performed by one or more processors of the example computing system 110 of FIG. 1. In some implementations, method 1100 may be performed by a single processing thread. Alternatively, method 1100 may be performed by two or more processing threads, each thread executing one or more individual functions, routines, subroutines, or operations of the method. In an illustrative example, the processing threads implementing method 1100 may be synchronized (e.g., using semaphores, critical sections, and/or other thread synchronization mechanisms). Alternatively, the processing threads implementing method 1100 may be executed asynchronously with respect to each other. Although shown in a particular sequence or order, unless otherwise specified, the order of the operations may be modified. Additionally, one or more operations may be omitted in various implementations.

In some implementations, method 1100 may be performed at the exchange level.

In some implementations, the yield curve model may be represented by the Nelson-Siegel (NS) model:

$$r^{ex_i}{}_t(T_j) = \beta_{1t} + \beta_{2t}\left(\frac{1 - \exp(-T_j\lambda)}{\lambda T_j}\right) + \beta_{3t}\left(\frac{1 - \exp(-T_j\lambda)}{\lambda T_j} - \exp(-\lambda T_j)\right)$$

or Nelson-Siegel-Svenson (NSS) model:

$$r^{ex_i}{}_t(T_j) = \beta_{1t} + \beta_{2t}\left(\frac{1 - \exp\exp(-T_j\lambda_1)}{\lambda_1 T_j}\right) +$$
$$\beta_{3t}\left(\frac{1 - \exp\exp(-T_j\lambda_1)}{\lambda T_j} - \exp(-\lambda_1 T_j)\right) + \beta_{4t}\left(\frac{1 - (-T_j\lambda_2)}{\lambda_2 T_j} - \exp(-\lambda_2 T_j)\right),$$

with the following parameters:

$r^{ex_i}{}_t(T_j)$: interest of the asset at maturity $T_j$ and exchange i $\beta_{1t}$: long term component of the rate level $\beta_{2t}$: short term component, slope of the term structure $\beta_{3t}$: medium term component and curvature of the term structure $\lambda_1$ and $\lambda_2$ (in the case of NSS model): time constant(s) associated with the equation [time−1]

At operation 1110, the computing system implementing the method constructs (using the example of the NS model, for illustration) the factors associated with each of the three $\beta_{kt}$'s (k=1, 2, 3) by computing $T_j$ the time to maturity in days and using for the time constant $\lambda$=31 days$^{-1}$. The value of the time constant may be obtained via a fixed grid search procedure in the minimization of the R2 value over a past period (e.g., the past year) of data.

At operation 1120, the computing system utilizes a linear regression framework to solve for the $\beta_{kt}$ parameters. Ordinary least squares may be sufficient. This amounts to minimizing the mean squared error (MSE$_i$) dataset for the i-th exchange:

$$MSE_i = \frac{1}{N_i} \sum\nolimits_{j=1}^{N_i} [r^{ex_i}(T_j) - \hat{r}^{ex_i}(T_j)]^2$$

where $r^{ex_i}(T_j)$ is the empirically computed implied rate and $\hat{r}^{ex_i}(T_j)$ is the Nelson-Siegel rate estimated using the equation shown above (using the example of the NS model, for illustration).

At operation 1130, the computing system, with the $\beta_k$ and the time constant $\lambda$ computed, extrapolate the interest rate curve and generate fixed maturity tenors (using the example of the NS model, for illustration).

Operations similar to the above described operations 1110-1130 may be performed in implementations in which the NSS model is used with four parameters $\beta_j$={$\beta_1$, $\beta_2$, $\beta_3$, $\beta_4$}$_j$, determined using method 800.

Figure 12:
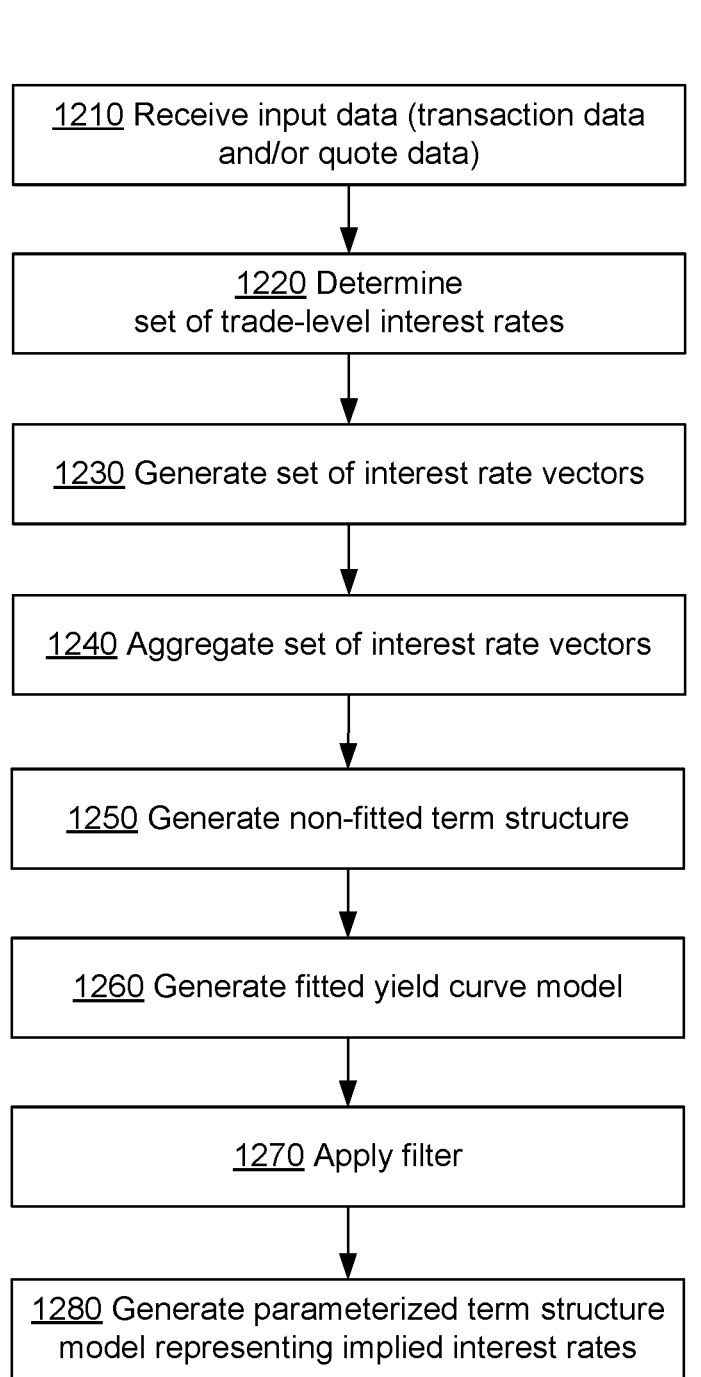
FIG. 12 is a flowchart of a method of computing implied interest rates based on cryptoasset derivative trade data, in accordance with embodiments of the present disclosure.

FIG. 12 is a flowchart of a method 1200 of computing implied interest rates based on cryptoasset derivative trade data, in accordance with embodiments of the present disclosure. Method 1200 and/or each of its individual functions, routines, subroutines, or operations may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some implementations, method 1200 may be performed by one or more processors of the example computing system 100 of FIG. 1. In some implementations, method 1200 may be performed by a single processing thread. Alternatively, method 1200 may be performed by two or more processing threads, each thread executing one or more individual functions, routines, subroutines, or operations of the method. In an illustrative example, the processing threads implementing method 1200 may be synchronized (e.g., using semaphores, critical sections, and/or other thread synchronization mechanisms). Alternatively, the processing threads implementing method 1200 may be executed asynchronously with respect to each other. Although shown in a particular sequence or order, unless otherwise specified, the order of the operations may be modified. Additionally, one or more operations may be omitted in various implementations.

At operation 1210, the computing system implementing the method receives input data, which can include transaction data characterizing a trade in a derivative (e.g., a future) of a specified cryptoasset and/or quote data for a derivative (e.g., a future) of a specified cryptoasset. The transaction data and/or quote data may comprise an identifier of an underlying asset, an expiration time of the future, an as-of time of the transaction, and a price of the future. In some implementations, the computing system may retrieve the transaction data from the normalized transaction database 235 of FIG. 2 and/or normalized transaction cache 238 of FIG. 2. In some implementations, the computing system may retrieve the quote data from the reference database 245 of FIG. 2. In an illustrative example, the computing system may retrieve and process the transaction data from the normalized transaction cache before switching to the non-cached transaction data stored in the normalized transaction database 235, thus forcing the computed implied rates to be biased towards the normalized transaction records that have been selected for caching (e.g., transaction records reported by a predefined one or more reference exchanges with respect to a predefined set of underlying cryptoasset), as described in more detail herein above.

At operation 1220, the computing system determines, based on the input data, a set of trade-level raw interest rates (e.g., from multiple instruments traded at a plurality of exchanges), as described in more detail herein above.

At operation 1230, the computing system generates a set of interest rate vectors based on the set of trade level interest rates, as described in more detail herein above.

At operation 1240, the computing system aggregates the set of interest rate vectors (e.g., across a plurality of times and/or across the plurality of exchanges), as described in more detail herein above.

At operation 1250, the computing system generates a non-fitted term structure for each data partition of a plurality of data partitions associated with the set of aggregated interest rate vectors, as described in more detail herein above.

At operation 1260, the computing system generates a fitted yield curve model based on the non-fitted term structure, as described in more detail herein above.

At operation 1270, the computing system applies a signal-to-noise extraction filter to the fitted yield curve model, as described in more detail herein above.

At operation 1280, the computing system generates, based on the filtered fitted yield curve model, a parametrized aggregated term structure model representing computed implied interest rates, as described in more detail herein above.

Figure 13:
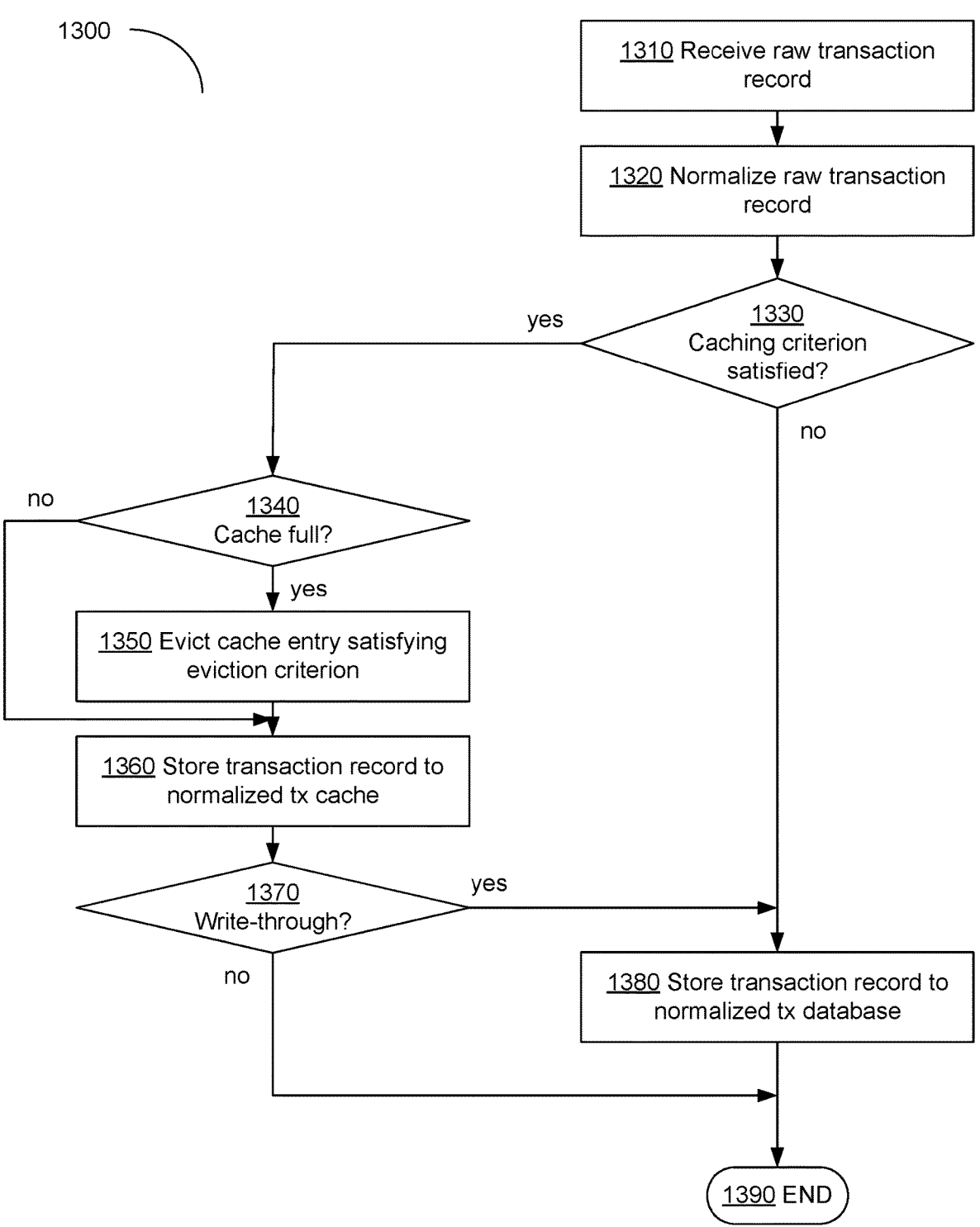
FIG. 13 is a flowchart of a method of pre-processing raw transaction records, in accordance with embodiments of the present disclosure.

FIG. 13 is a flowchart of a method 1300 of pre-processing raw transaction records, in accordance with embodiments of the present disclosure. Method 1300 and/or each of its individual functions, routines, subroutines, or operations may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some implementations, method 1300 may be performed by one or more processors of the example computing system 100 of FIG. 1. In some implementations, method 1300 may be performed by a single processing thread. Alternatively, method 1300 may be performed by two or more processing threads, each thread executing one or more individual functions, routines, subroutines, or operations of the method. In an illustrative example, the processing threads implementing method 1300 may be synchronized (e.g., using semaphores, critical sections, and/or other thread synchronization mechanisms). Alternatively, the processing threads implementing method 1300 may be executed asynchronously with respect to each other. Although shown in a particular sequence or order, unless otherwise specified, the order of the operations may be modified. Additionally, one or more operations may be omitted in various implementations.

At operation 1310, the computing system implementing the method receives a raw transaction record. In an illustrative example, the transaction record may reflect a trade in derivatives (e.g., futures) of a specified cryptoasset and thus may include information identifying the transaction date, the type of the derivative, the expiration date of the futures, the price of the futures, and an identifier of the underlying cryptoasset or index.

At operation 1320, the computing system normalizes the raw transaction record. In an illustrative example, translating the raw transaction record into one or more normalized transaction records may involve validating and normalizing asset identifiers (e.g., by comparing an asset identifier specified by a transaction record to a reference list of asset identifiers). In another illustrative example, translating the raw transaction record into normalized transaction record(s) may further involve validating and/or modifying various other transaction record fields. In another illustrative example, translating the raw transaction record into normalized transaction record(s) may further involve appending, to the normalized transaction record, a weight coefficient characterizing the exchange that has provided the original raw transaction record and/or other transaction attributes specified by certain transaction record fields, as described in more detail herein below. In another illustrative example, translating the raw transaction record into normalized transaction record(s) may further involve discarding the raw transaction record if it fails to satisfy one or more filtering conditions that may be defined based on one or more transaction attributes specified by certain transaction record fields.

Responsive to determining, at operation 1330, that the normalized transaction record satisfies a predefined caching criterion, the processing continues at operation 1340; otherwise, the method branches to operation 1380.

In some implementations, the caching criterion employed for deciding whether a given normalized transaction record should be cached may be based upon one or more parameters, including transaction timestamp, underlying asset identifier, and/or exchange identifier. In an illustrative example, the most recent normalized transaction records may be cached, and the corresponding eviction policy may cause the transaction record having the least recent timestamp to be evicted should the cache become full. In another illustrative example, a predefined number of most extensively traded underlying cryptoassets may be chosen for caching their respective most recent normalized transaction records. In yet another illustrative example, one or more reference exchanges may be chosen for caching their reported transaction records. In yet another illustrative example, transaction records that are sampled across different times (e.g., randomly) may be cached, in order to ensure temporal diversity. In yet another illustrative example, transaction records that are sampled according to a distribution that has a higher probability of sampling trades between unrelated parties (arm-length trades) and a lower probability of sampling trades between related parties may be cached. Various combinations of the above-described conditions may be constructed to form the caching criterion, e.g., caching the most recent normalized transaction records reported by the reference exchanges for a predefined set of most extensively traded cryptoassets.

Responsive to determining, at operation 1340, that the cache is full, the processing continues at operation 1350; otherwise, the method branches to operation 1360. In some implementations, the memory buffer storing the normalized transaction record cache may be split into multiple portions, such that each portion may be assigned to a respective cryptoasset (e.g., of a predefined set of most extensively traded cryptoassets). Accordingly, responsive to determining that the cache portion corresponding to the cryptoasset identifier is full, the processing continues at operation 1350.

At operation 1350, the computing system identifies a cache entry for eviction and evicts the identified victim cache entry. In an illustrative example, evicted is the transaction record having the least recent timestamp among the cached transaction records associated with the underlying cryptoasset of the normalized transaction record that needs to be cached.

At operation 1360, the computing system stores the normalized transaction record to an available cache entry (e.g., the cache entry from which a victim cached record has been evicted at operation 1350).

Responsive to determining, at operation 1370, that the write-through caching policy is implemented, the computing system, at operation 1380, stores the normalized transaction record to the backing store (e.g., the transaction record database). Upon completing the operation 1380, the method terminates at operation 1390.

FIG. 14 illustrates an example machine of a computing system 1400 within which a set of instructions, for causing the machine to perform any one or more of the methods discussed herein, may be executed. In some embodiments, the computing system 1400 may be a computing device that includes a processor with a cache controller, a memory controller, or combination thereof. In alternative embodiments, the machine may be connected (e.g., networked) to other machines in a LAN, an intranet, an extranet, and/or the Internet. The machine may operate in the capacity of a server or a client machine in a client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methods discussed herein.

The example computing system 1400 includes a processing device 1402 (e.g., Processor 122), a main memory 1404 (e.g., read-only memory (ROM), flash memory, dynamic random access memory (DRAM) such as synchronous DRAM (SDRAM), etc.), a static memory 14014 (e.g., flash memory, static random access memory (SRAM), etc.), and a data storage system 1418, which communicate with each other via a bus 1430.

Processing device 1402 may represent one or more general-purpose processing devices such as a microprocessor, a central processing unit, or the like. More particularly, the processing device may be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1402 may also be one or more special-purpose processing devices such as an application specific integrated circuit (ASIC), a field programmable gate array (FPGA), a digital signal processor (DSP), network processor, bus controller, peripheral device controller, or the like. The processing device 1402 is configured to execute instructions 1428 for performing the operations and steps discussed herein. The computing system 1400 may further include a network interface device 14014 to communicate over the network 1420.

The data storage system 1418 may include a machine-readable storage medium 1424 (also known as a non-transitory computer-readable medium) on which is stored one or more sets of instructions 1428 or software embodying any one or more of the methods or functions described herein. The instructions 1428 may also reside, completely or at least partially, within the main memory 1404 and/or within the processing device 1402 during execution thereof by the computing system 1400, the main memory 1404 and the processing device 1402 also constituting machine-readable storage media. In one embodiment, the instructions 1428 include instructions of various methods described herein, including, e.g., the method 1200 of determining implied interest rates based on cryptoasset derivative trade data.

While the machine-readable storage medium 1424 is shown in an example embodiment to be a single medium, the term "non-transitory machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methods of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure may refer to the action and processes of a computing system, or similar electronic computing device, that manipulates and transforms data represented as physical (electronic) quantities within the computing system's registers and memories into other data similarly represented as physical quantities within the computing system memories or registers or other such information storage systems.

The present disclosure also relates to an apparatus for performing the operations herein. This apparatus may be specially constructed for the intended purposes, or it may include a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computing system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The systems and methods of the present disclosure may be implemented as a computer program product, or software, that may include a machine-readable medium having stored thereon instructions, which may be used to program a computing system (or other electronic devices) to perform a process according to the present disclosure. A machine-readable medium includes any mechanism for storing information in a form readable by a machine (e.g., a computer). In some embodiments, a machine-readable (e.g., non-transitory computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications may be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method, comprising:

receiving, by a processing device, input data comprising a set of normalized transaction records;

storing the normalized transaction records in a normalized transaction record cache stored in a memory buffer, wherein the memory buffer is split into a plurality of portions, wherein each portion is assigned to a respective cryptoasset, and wherein a size of each of the plurality of portions is determined based on a trading volume of the respective cryptoasset assigned to each portion;

determining, based on the input data, a set of trade-level raw interest rates;

generating, using the set of trade level interest rates, a set of interest rate vectors;

aggregating the set of interest rate vectors to obtain a set of aggregated interest rate vectors;

generating a non-fitted term structure associated with the set of aggregated interest rate vectors;

generating a fitted yield curve model based on the non-fitted term structure;

applying a signal-to-noise extraction filter to the fitted yield curve model; and generating, based on the filtered fitted yield curve model, an aggregated term structure model representing computed implied interest rates.

2. The method of claim 1, further comprising:

providing an application programming interface (API) output of the set of interest rate vectors.

3. The method of claim 1, further comprising:

providing an API output of the computed interest rates.

4. The method of claim 1, further comprising:

providing an API output of rate statistics.

5. The method of claim 1, further comprising:

applying consistency checks to validate the computed trade-level raw interest rate.

6. The method of claim 1, further comprising:

applying consistency checks to validate the fitted yield curve model.

7. The method of claim 1, further comprising:

generating a graphical user interface visually representing the computed implied interest rates.

8. The method of claim 1, wherein the size of each of the plurality of portions is determined based on the trading volume of the respective cryptoasset assigned to each portion over a certain period of time at one or more reference exchanges.

9. The method of claim 8, wherein determining the set of trade-level raw interest rates further comprises:

processing cached normalized transaction records before switching to non-cached normalized transaction records thus forcing the computed implied rates to be biased towards the normalized transaction records that have been selected for caching.

10. The method of claim 1, wherein the set of interest rate vectors is aggregated across one of: a plurality of times or a plurality of exchanges.

11. A system comprising:

a memory;

a processing device, communicably coupled to the memory, the processing device configured to:

receive input data comprising a set of normalized transaction records;

store the normalized transaction records in a normalized transaction record cache stored in a memory buffer, wherein the memory buffer is split into a plurality of portions, wherein each portion is assigned to a respective cryptoasset, and wherein a size of each of the plurality of portions is determined based on a trading volume of the respective cryptoasset assigned to each portion;

determine, based on the input data, a set of trade-level raw interest rates;

generate, using the set of trade level interest rates, a set of interest rate vectors;

aggregate the set of interest rate vectors to obtain a set of aggregated interest rate vectors;

generate a non-fitted term structure associated with the set of aggregated interest rate vectors;

generate a fitted yield curve model based on the non-fitted term structure;

apply a signal-to-noise extraction filter to the fitted yield curve model; and generate, based on the filtered fitted yield curve model, an aggregated term structure model representing computed implied interest rates.

12. The system of claim 11, wherein the processing device is further configured to:

provide an application programming interface (API) output of the set of interest rate vectors.

13. The system of claim 11, wherein the processing device is further configured to:

provide an API output of the computed interest rates.

14. The system of claim 11, wherein the processing device is further configured to:

generate a graphical user interface visually representing the computed implied interest rates.

15. The system of claim 11, wherein the size of each of the plurality of portions is determined based on the trading volume of the respective cryptoasset assigned to each portion over a certain period of time at one or more reference exchanges.

16. The system of claim 15, wherein determining the set of trade-level raw interest rates further comprises:

processing cached normalized transaction records before switching to non-cached normalized transaction records thus forcing the computed implied rates to be biased towards the normalized transaction records that have been selected for caching.

17. A non-transitory machine-readable storage medium comprising executable instructions which, when executed by a processing device, cause the processing device to:

receive input data comprising a set of normalized transaction records;

store the normalized transaction records in a normalized transaction record cache stored in a memory buffer, wherein the memory buffer is split into a plurality of portions, wherein each portion is assigned to a respective cryptoasset, and wherein a size of each of the plurality of portions is determined based on a trading volume of the respective cryptoasset assigned to each portion;

determine, based on the input data, a set of trade-level raw interest rates;

generate, using the set of trade level interest rates, a set of interest rate vectors;

aggregate the set of interest rate vectors to obtain a set of aggregated interest rate vectors;

generate a non-fitted term structure associated with the set of aggregated interest rate vectors;

generate a fitted yield curve model based on the non-fitted term structure;

apply a signal-to-noise extraction filter to the fitted yield curve model; and generate, based on the filtered fitted yield curve model, an aggregated term structure model representing computed implied interest rates.

18. The non-transitory machine-readable storage medium of claim 17, further comprising executable instructions which, when executed by the processing device, cause the processing device to:

generate a graphical user interface visually representing the computed implied interest rates.

19. The non-transitory machine-readable storage medium of claim 17, wherein the size of each of the plurality of portions is determined based on the trading volume of the respective cryptoasset assigned to each portion over a certain period of time at one or more reference exchanges.

20. The non-transitory machine-readable storage medium of claim 19, wherein determining the set of trade-level raw interest rates further comprises:

processing cached normalized transaction records before switching to non-cached normalized transaction records thus forcing the computed implied rates to be biased towards the normalized transaction records that have been selected for caching.

<div align="center">* * * * *</div>